US009669579B2

(12) United States Patent
Kline et al.

(10) Patent No.: US 9,669,579 B2
(45) Date of Patent: *Jun. 6, 2017

(54) AIRCRAFT SKIN ATTACHMENT SYSTEM

(71) Applicant: The Boeing Company, Chicago, IL (US)

(72) Inventors: William T. Kline, Seattle, WA (US); Charles J. Nelson, Clyde Hills, WA (US); Thang D. Phung, Burien, WA (US); Curtis M. Groth, Seattle, WA (US); Robert G. Meyer, Renton, WA (US); Peter J. VanVoast, Seattle, WA (US); Charles Y. Hu, Newcastle, WA (US); Geoffrey A. Butler, Seattle, WA (US); Dan D. Day, Seattle, WA (US); Thomas J. Kennedy, Bonney Lake, WA (US); Luis A. Perla, Sammamish, WA (US); Richard A. Ransom, Fall City, WA (US); Justin L. Holland, Algona, WA (US); Erik Lund, Burien, WA (US); Joseph F. Warren, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 143 days.

This patent is subject to a terminal disclaimer.

(21) Appl. No.: 14/489,115

(22) Filed: Sep. 17, 2014

(65) Prior Publication Data
US 2015/0004347 A1 Jan. 1, 2015

Related U.S. Application Data

(60) Continuation-in-part of application No. 14/047,244, filed on Oct. 7, 2013, now Pat. No. 9,475,230, which
(Continued)

(51) Int. Cl.
*B29C 65/00* (2006.01)
*B29C 65/02* (2006.01)
(Continued)

(52) U.S. Cl.
CPC .............. *B29C 65/02* (2013.01); *B29C 35/02* (2013.01); *B29C 43/10* (2013.01);
(Continued)

(58) Field of Classification Search
CPC ... B29C 65/26; B29C 65/505; B29C 65/5071; B29C 65/5042; B29C 65/82421;
(Continued)

(56) References Cited

U.S. PATENT DOCUMENTS 2,390,684 A * 12/1945 Bendix .................. B27D 1/083
156/498
2,960,147 A 11/1960 Ferrell
(Continued)

FOREIGN PATENT DOCUMENTS

EP 0999035 A2 5/2000
EP 1393875 A1 3/2004
(Continued)

OTHER PUBLICATIONS

European Search Report, dated Feb. 23, 2010, regarding Application No. EP09176006.6, 2 pages.
(Continued)

*Primary Examiner* — John Goff
(74) *Attorney, Agent, or Firm* — Yee & Associates, P.C.

(57) ABSTRACT

A method for forming a structural member and a structural member produced thereby includes positioning a first composite section and a second composite section within a tool. The tool has an inner surface and a wall intersection and is supported by a tool platform. The tool platform and a pressure platform are relatively movable between an open
(Continued)

position and a closed position. The tool has a non-planar outer surface against which the member may be pressed. A composite splice member is positioned at least partially overlapping both the first composite section and the second composite section to form a joint in the composite structural member. The composite structural member is pressed against the non-planar outer surface of the tool by applying pressure to the joint from a pressure bladder. Heat is applied to the composite structural member at the joint to cure the composite splice member to the first composite section and the second composite section.

13 Claims, 27 Drawing Sheets

Related U.S. Application Data is a division of application No. 13/647,108, filed on Oct. 8, 2012, now Pat. No. 8,580,071, which is a division of application No. 12/725,305, filed on Mar. 16, 2010, now Pat. No. 8,307,872, which is a continuation-in-part of application No. 12/270,682, filed on Nov. 13, 2008, now abandoned.

(51) Int. Cl.
*B29C 70/44* (2006.01)
*B29C 65/26* (2006.01)
*B29C 65/48* (2006.01)
*B29C 65/50* (2006.01)
*B29C 35/02* (2006.01)
*B29C 43/36* (2006.01)
*B29C 65/18* (2006.01)
*B29C 43/10* (2006.01)
*B64F 5/10* (2017.01)
*B29K 105/06* (2006.01)
*B29L 31/00* (2006.01)
*B29C 33/02* (2006.01)
*B29C 33/30* (2006.01)
*B29C 43/52* (2006.01)
*B29C 43/58* (2006.01)
*B29L 31/30* (2006.01)

(52) U.S. Cl.
CPC .......... *B29C 43/3642* (2013.01); *B29C 65/18* (2013.01); *B29C 65/26* (2013.01); *B29C 65/4835* (2013.01); *B29C 65/505* (2013.01); *B29C 65/5042* (2013.01); *B29C 65/5071* (2013.01); *B29C 65/5085* (2013.01); *B29C 66/1142* (2013.01); *B29C 66/1162* (2013.01); *B29C 66/5241* (2013.01); *B29C 66/63* (2013.01); *B29C 66/721* (2013.01); *B29C 66/81455* (2013.01); *B29C 66/81811* (2013.01); *B29C 66/91212* (2013.01); *B29C 66/91231* (2013.01); *B29C 66/91421* (2013.01); *B29C 66/91443* (2013.01); *B29C 66/91631* (2013.01); *B29C 66/9221* (2013.01); *B29C 66/9241* (2013.01); *B29C 66/961* (2013.01); *B29C 70/44* (2013.01); *B64F 5/10* (2017.01); *B29C 33/02* (2013.01); *B29C 33/30* (2013.01); *B29C 43/52* (2013.01); *B29C 43/58* (2013.01); *B29C 66/1122* (2013.01); *B29C 66/128* (2013.01); *B29C 66/14* (2013.01); *B29C 66/5243* (2013.01); *B29C 66/71* (2013.01); *B29C 66/723* (2013.01); *B29C 66/7212* (2013.01); *B29C 66/73941* (2013.01); *B29C 66/81261* (2013.01); *B29C 66/81831* (2013.01); *B29C 2043/3615* (2013.01); *B29C 2043/3649* (2013.01); *B29C 2043/5816* (2013.01); *B29K 2105/06* (2013.01); *B29L 2031/003* (2013.01); *B29L 2031/3085* (2013.01); *Y10T 428/19* (2015.01); *Y10T 428/192* (2015.01)

(58) Field of Classification Search
CPC ............ B29C 66/81455; B29C 66/855; B29C 66/82421; B64F 5/009; B64F 5/10
See application file for complete search history.

(56) References Cited

U.S. PATENT DOCUMENTS

| | | | |
|---|---|---|---|
| 3,467,412 A * | 9/1969 | Gore | B29C 65/505 138/137 |
| 3,553,043 A | 1/1971 | Anderson | |
| 3,577,304 A | 5/1971 | Guyer | |
| 3,664,907 A | 5/1972 | Price | |
| 3,806,928 A | 4/1974 | Costanza | |
| 3,964,958 A | 6/1976 | Johnston | |
| 4,331,495 A | 5/1982 | Lackman et al. | |
| 4,495,764 A | 1/1985 | Gnagy | |
| 4,565,595 A | 1/1986 | Whitener | |
| 4,662,587 A | 5/1987 | Whitener | |
| 4,687,691 A | 8/1987 | Kay | |
| 4,909,870 A * | 3/1990 | Gould | A44B 19/16 156/178 |
| 4,966,802 A * | 10/1990 | Hertzberg | B29C 65/601 112/423 |
| 4,995,146 A | 2/1991 | Woods | |
| 5,046,688 A | 9/1991 | Woods | |
| 5,053,091 A * | 10/1991 | Giljam | B29C 47/0021 156/244.24 |
| 5,086,997 A | 2/1992 | Glass | |
| 5,158,641 A | 10/1992 | Vermeulen et al. | |
| 5,216,799 A | 6/1993 | Charnock et al. | |
| 5,248,242 A | 9/1993 | Lallo et al. | |
| 5,403,427 A | 4/1995 | Wilcox | |
| 5,562,796 A | 10/1996 | Ertel | |
| 5,562,798 A | 10/1996 | Weder et al. | |
| 6,114,050 A | 9/2000 | Westre et al. | |
| 6,237,873 B1 | 5/2001 | Amaoka et al. | |
| 6,481,482 B1 | 11/2002 | Shimotomai | |
| 6,565,942 B2 | 5/2003 | Anderson et al. | |
| 6,622,974 B1 | 9/2003 | Dockter et al. | |
| 6,723,271 B2 | 4/2004 | Hemphill et al. | |
| 6,776,371 B2 | 8/2004 | Tanaka et al. | |
| 6,786,452 B2 | 9/2004 | Yamashita et al. | |
| 6,976,829 B2 | 12/2005 | Kovalsky et al. | |
| 7,438,524 B2 | 10/2008 | Lyders et al. | |
| 7,707,708 B2 | 5/2010 | Douglas et al. | |
| 8,307,872 B2 | 11/2012 | Kendall et al. | |
| 8,580,071 B2 | 11/2013 | Kendall et al. | |
| 2002/0149134 A1 | 10/2002 | Hemphill et al. | |
| 2002/0157785 A1 | 10/2002 | Anderson et al. | |
| 2005/0016714 A1 | 1/2005 | Chung | |
| 2006/0070338 A1 | 4/2006 | Pantelides et al. | |
| 2006/0249868 A1 | 11/2006 | Brown et al. | |
| 2007/0062022 A1 | 3/2007 | Douglas et al. | |
| 2008/0169380 A1 | 7/2008 | Jackson et al. | |
| 2008/0277531 A1 | 11/2008 | Ackermann et al. | |
| 2009/0145545 A1 | 6/2009 | Brennan et al. | |
| 2009/0261199 A1 | 10/2009 | McCarville et al. | |
| 2010/0116938 A1 | 5/2010 | Kline et al. | |
| 2010/0170613 A1 | 7/2010 | Kendall et al. | |
| 2013/0025765 A1 | 1/2013 | Kendall et al. | |
| 2014/0096913 A1 | 4/2014 | Kendall et al. | |

FOREIGN PATENT DOCUMENTS

| | | |
|---|---|---|
| EP | 2186622 A1 | 5/2010 |
| EP | 2213445 A1 | 8/2010 |
| EP | 2404740 A1 | 1/2012 |
| FR | 1308557 A | 11/1962 |

(56) References Cited

FOREIGN PATENT DOCUMENTS

| | | | |
|---|---|---|---|
| FR | 2587273 A1 | 3/1987 | |
| FR | 2710871 A1 | 4/1995 | |
| GB | 1236229 A | 6/1971 | |
| GB | 1289219 A * | 9/1972 | ............ B32B 27/00 |
| GB | 2478850 B | 6/2012 | |
| JP | S5979730 A | 9/1984 | |
| NL | WO 2007035100 A2 * | 3/2007 | ............ B29C 33/04 |
| WO | WO2004110738 A2 | 12/2004 | |
| WO | WO2006033140 A1 | 3/2006 | |
| WO | WO2007024882 A2 | 3/2007 | |
| WO | WO2008152582 A2 | 12/2008 | |
| WO | WO 2009017864 A2 * | 2/2009 | ........... B29C 65/505 |

OTHER PUBLICATIONS

Extended European Search Report, dated Dec. 8, 2011, regarding Application No. EP11169616.7, 7 pages.

Combined Search and Examination Report, dated Jul. 15, 2011, regarding Application No. GB1104474.0, 7 pages.

Knights, "Rapid Tooling: It's Faster in Molding, Too," Plastics Technology online magazine, Mar. 2005, 7 pages. Accessed Apr. 9, 2012, http://www.ptonline.com/articles/rapid-tooling-it's-faster-in-molding-too.

Menges et al., "Auf Dem Weg Zu Automatisierbaren Fuegeverfahren", Plastverarbeiterl, Huethig Gmbh, Heidelbelrg, German, vol. 38, No. 12, Dec. 1987, pp. 41-47 (XP002048855) (translation not available).

Netze, "Ultraschallschweissen von Hochtemperaturbestandigen, Universtarkten, Kurzglasfaser-und Endlosfaserverstarkten Thermoplasten (Ultrasonic welding of advanced, not reinforced, short and continuous fibre reinforced thermoplastics)", Dissertation, Jan. 1993, 83 pp. (XP007914444) (translation not available).

Office Action, dated Oct. 1, 2012, regarding U.S. Appl. No. 12/270,682, 24 pages.

Office Action, dated Mar. 29, 2013, regarding U.S. Appl. No. 12/270,682, 7 pages.

Final Office Action, dated Oct. 28, 2013, regarding U.S. Appl. No. 12/270,682, 8 pages.

Office Action, dated Apr. 4, 2012, regarding U.S. Appl. No. 12/725,305, 23 pages.

Notice of Allowance, dated Sep. 11, 2012, regarding U.S. Appl. No. 12/725,305, 7 pages.

Office Action, dated Feb. 15, 2013, regarding U.S. Appl. No. 13/647,108, 15 pages.

Notice of Allowance, dated Jul. 22, 2013, regarding U.S. Appl. No. 13/647,108, 8 pages.

Office Action, dated Feb. 23, 2015, regarding U.S. Appl. No. 14/047,224, 21 pages.

European Patent Office Communication, dated Oct. 17, 2014, regarding Application No. EP11169616.7, 5 pages.

\* cited by examiner

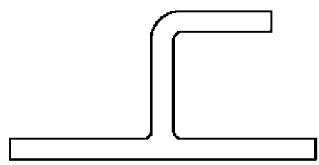
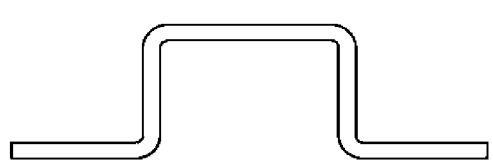
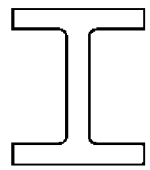
FIG. 7　　　　　FIG. 8　　　　　FIG. 9
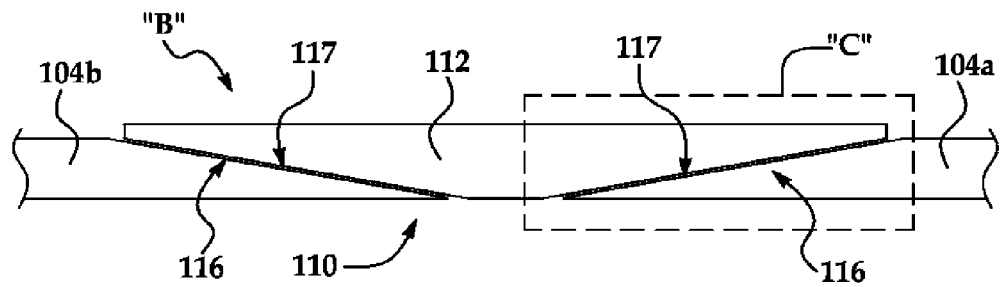
FIG. 10
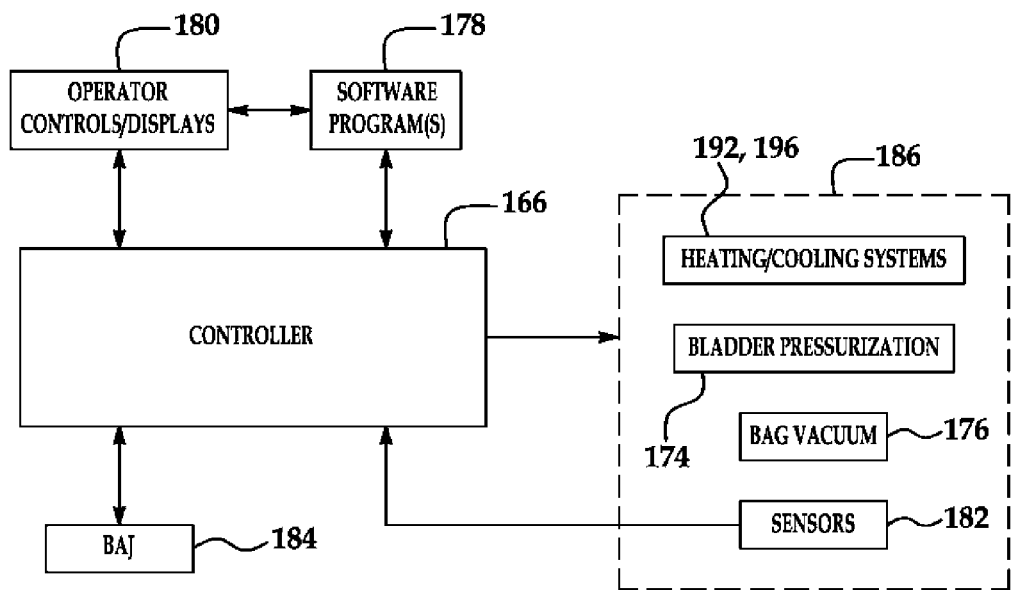
FIG. 12

AIRCRAFT SKIN ATTACHMENT SYSTEM

CROSS-REFERENCE TO RELATED APPLICATIONS

The present application is a continuation-in-part application of U.S. application Ser. No. 14/047,244, filed on Oct. 7, 2013, now U.S. Pat. No. 9,457,230, and entitled HEATED TOOL ASSEMBLY FOR FORMING A STRUCTURAL MEMBER, which is a divisional application of and claims priority to U.S. application Ser. No. 13/647,108 filed on Oct. 8, 2012, now U.S. Pat. No. 8,580,071, and entitled METHOD OF JOINING COMPOSITE STRUCTURAL MEMBERS USING THERMAL SPREADER, which is a divisional application of and claims priority to U.S. application Ser. No. 12/725,305 filed on Mar. 16, 2010, now U.S. Pat. No. 8,307,872, and entitled APPARATUS FOR CURING A COMPOSITE STRUCTURAL MEMBER, which is a continuation-in-part application of and claims priority to U.S. application Ser. No. 12/270,682 filed on Nov. 13, 2008, now abandoned, and entitled METHOD AND APPARATUS FOR JOINING COMPOSITE STRUCTURAL MEMBERS AND STRUCTURAL MEMBERS MADE THEREBY, the entire contents of each one of the above-referenced applications being expressly incorporated by reference herein.

BACKGROUND INFORMATION

1. Field

The present disclosure relates generally to joining composite components and, more particularly, to maintaining a substantially uniform temperature across a joint between composite components.

2. Background

When fabricating relatively long composite structural members, composite components may be joined end-to-end at a splice joint. For example, in the aircraft industry, a spar of an aircraft wing may be formed by joining two or more relatively long composite sections of the spar using a splice member. The splice member may be bonded to the composite sections by applying heat when the composite sections and splice member are mounted within a bonding fixture such that the composite sections and splice member may be co-cured or co-bonded to form the complete spar.

In order to meet manufacturing requirements, it is typically necessary to apply heat to the splice joint within a relatively narrow temperature range. The temperature range must be held for a predetermined amount of time until the composite components are cured. In addition, it is typically necessary to attain a substantially uniform temperature across the length of the splice joint without substantial variation in the temperature.

For co-cured or co-bonded composite components, it may also be necessary to apply pressure to the composite components while applying heat in order to attain the maximum mechanical properties and other attributes of the composite components. An autoclave is commonly used in the fabrication of composite components as a means for applying heat and pressure in a controlled and uniform manner. However, for components that are relatively long such as the spar of a wing, it may not be possible to install the components in an autoclave for the application of heating and pressure due to length limitations of most autoclaves.

Accordingly, there exists a need in the art for a method for joining composite components of relatively long length without the need for an autoclave. Furthermore, there exists a need in the art for an apparatus and method for joining composite components wherein such composite components may be maintained at a substantially uniform temperature across the length of the joint without substantial temperature variation.

SUMMARY

The above-noted needs associated with applying pressure and uniform heat across a splice joint are specifically addressed by the present disclosure which provides a method for producing a composite structural member. A first composite section and a second composite section are positioned within a tool. The tool is supported by a tool platform and having an inner surface and a wall intersection. The tool platform and a pressure platform are relatively movable between an open position and a closed position. The tool has a non-planar outer surface against which the composite structural member may be pressed.

A composite splice member is positioned at least partially overlapping both the first composite section and the second composite section to form a joint in the composite structural member. The composite structural member is pressed against the non-planar outer surface of the tool by applying pressure to the joint from a pressure bladder. Heat is applied to the composite structural member at the joint to cure the composite splice member to the first composite section and the second composite section.

In a further embodiment, disclosed is a composite structural member prepared by a process. The process may comprise positioning a first composite section and a second composite section within a tool. The tool platform and a pressure platform are relatively movable between an open position and a closed position. The tool has a non-planar outer surface against which the composite structural member may be pressed.

The process may further include positioning a composite splice member at least partially overlapping both the first composite section and the second composite section to form a joint in the composite structural member.

The process may further include pressing the composite structural member against the non-planar outer surface of the tool by applying pressure to the joint from a pressure bladder.

The process may further include applying heat to the composite structural member at the joint to cure the composite splice member to the first composite section and the second composite section.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIGS. 5-9 are cross-sectional views illustrating shapes of alternative composite sections;

FIG. 10 is a sectional view of the area designated as "B" of FIG. 3;

FIG. 12 is a block diagram illustrating a control system used in an apparatus for structural bonding of composite sections;

DETAILED DESCRIPTION

Figure 1:
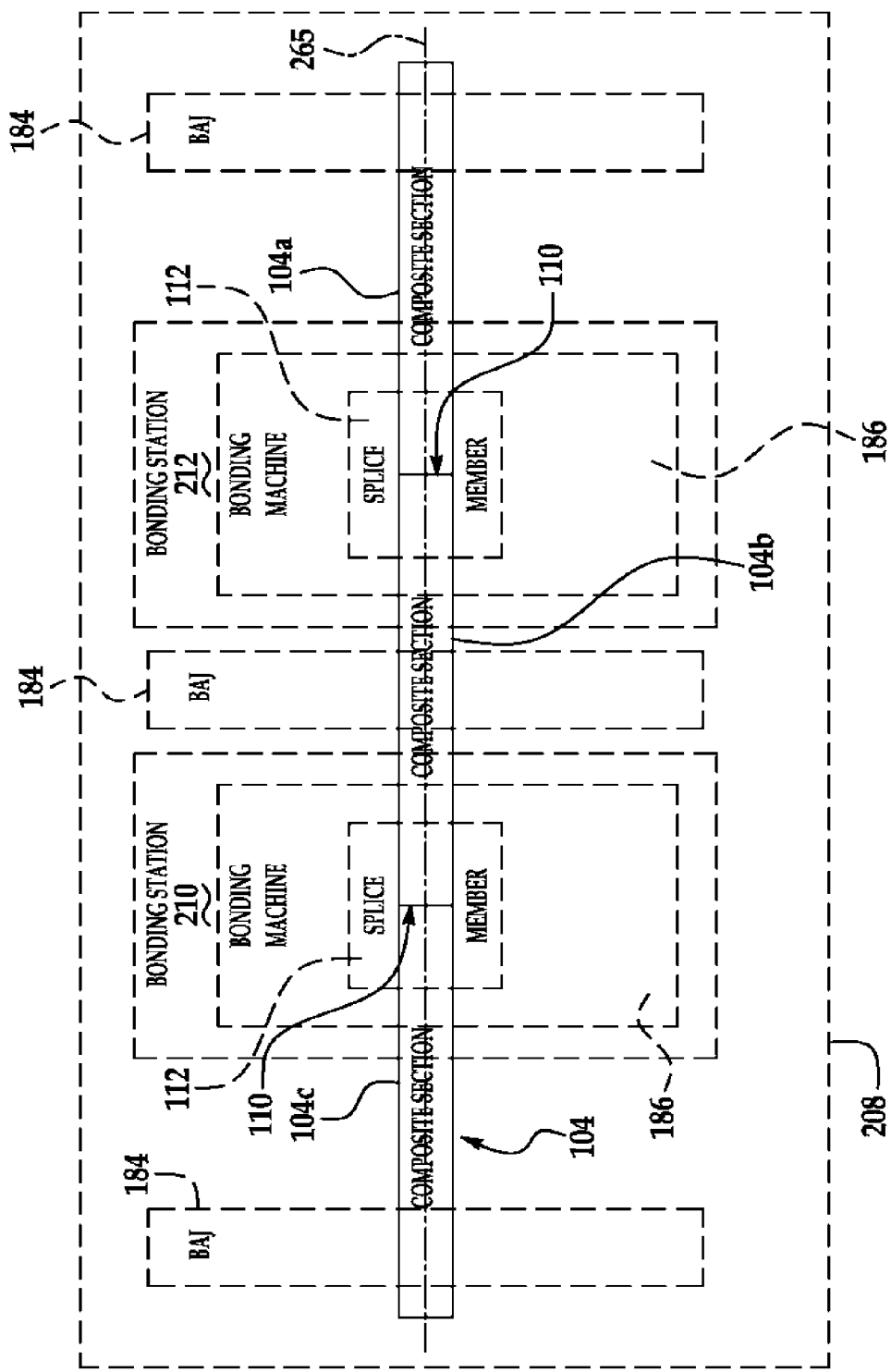
FIG. 1 is a broad block diagram of an apparatus for joining composite sections to form a continuous structural member.

Referring now to the drawings wherein the showings are for purposes of illustrating preferred and various embodiments of the disclosure only and not for purposes of limiting the same, shown in FIG. 1 is a typical production cell 208 as may be used to join elongate composite components such as composite sections 104a, 104b, 104c, to form a continuous structural member 104 such as, without limitation, a stringer, a spar, and a frame. At least a first composite section 104a and a second composite section 104b may be joined in end-to-end relationship using a structural bond therebetween to form a splice joint 110. The composite sections 104a-104c may be supported by a plurality of aligned bond assembly jigs 184. The bond assembly jigs 184 may support the composite sections 104a-104c in aligned relationship while allowing the latter to be pulled along their longitudinal axes 265 into bonding machines 186 respectively located at bonding stations 210, 212. The bonding stations 210, 212 may be located along the length of the structural member 104 where the splice joints 110 may be bonded.

Figure 2:
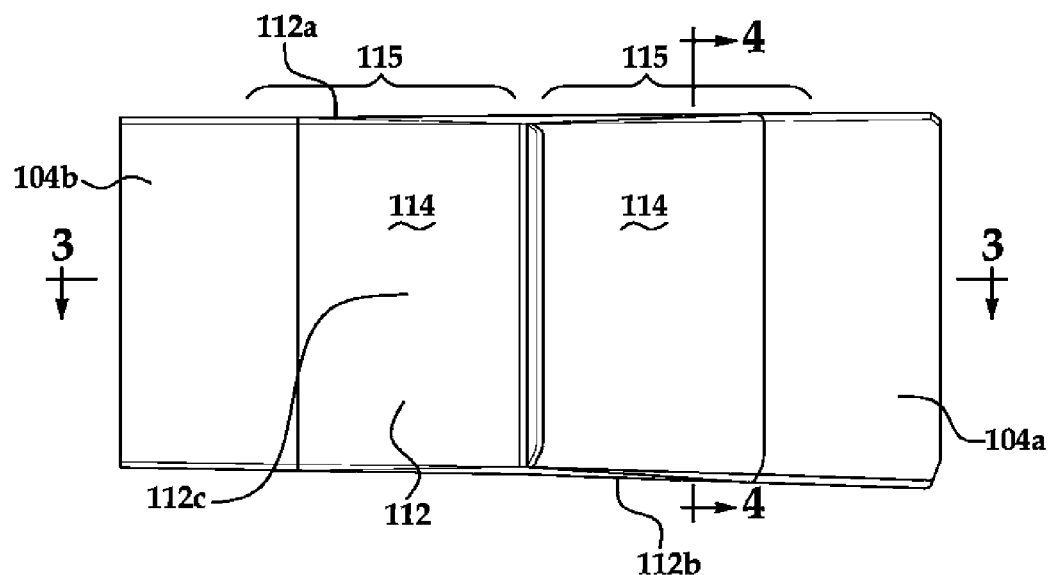
FIG. 2 is an elevational view of the splice joint between two composite sections shown in FIG. 1.
Figure 3:
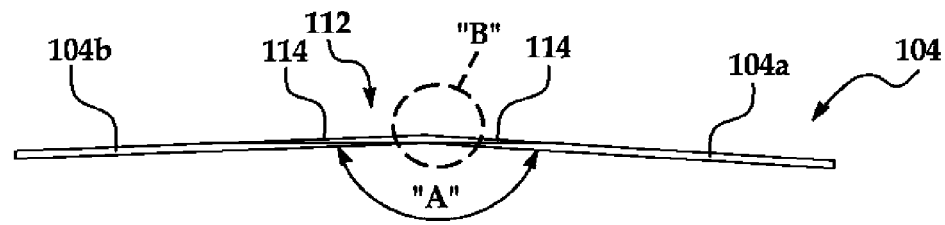
FIG. 3 is a sectional view taken along the line 3-3 of FIG. 2.
Figure 4:
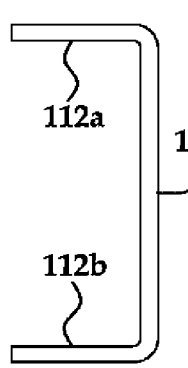
FIG. 4 is a sectional view taken along the line 4-4 of FIG. 2.

Referring to FIGS. 2-4, in accordance with the disclosed embodiments, the structural member may be formed by joining a number of composite sections such as composite sections 104a and 104b in end-to-end relationship using splice joints. FIG. 3 illustrates a top view of one specific structural member 104, in which first and second composite sections 104a, 104b respectively, are joined together at a splice joint forming a "kink" or angle designated as "A".

Each of the composite sections 104a, 104b may comprise a cured composite laminate having any of various cross-sectional geometries. However, as will be described below, the composite sections 104a, 104b chosen to illustrate the embodiments have a C-shape cross-section as shown in FIG. 4.

Figure 5:
Figure 6:
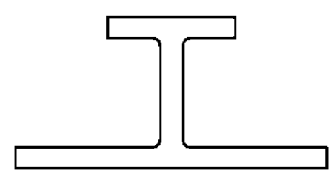

It should be noted here that while a particular structural member 104 has been illustrated in the Figures, the disclosed embodiments may be employed to form any one of a wide variety of elongate structural members by bonding composite sections together using composite splice joints. For example, and without limitation, the disclosed embodiments may be used to splice composite sections, especially elongate sections to form composite floor beams, frames, and stringers to name only a few. Moreover, the structural members 104 may have any one of a wide variety of cross-sectional shapes, including, without limitation, a Z shape shown in FIG. 5, a T shape shown in FIG. 6, a J shape shown in FIG. 7, a hat shape shown in FIG. 8 or an I shape shown in FIG. 9.

Referring now to FIGS. 2 and 3, first and second adjacent composite sections 104a, 104b may be bonded together using a composite splice member 112 which, as best seen in FIG. 4, may have a generally C shape cross-section corresponding to the cross-section of the composite sections 104a, 104b. The splice member 112 may include top and bottom flanges 112a, 112b connected by a web 112c. Although the splice member is shown as being of a one-piece construction in the illustrated example, the splice member 112 may comprise two or more sections or pieces in some applications. Since the composite sections 104a, 104b form a slight angle "A" (FIG. 3), the splice member 112 may include two adjacent sections 114 as shown in FIG. 2 which form an angle that may be substantially equal to the angle "A". As best seen in FIG. 10, the splice member 112 forms an overlapping, scarf-type joint 110 with the adjoining composite sections 104a, 104b. It should be noted here that while a scarf joint 110 has been illustrated, other types of joints may be employed to form the splice joint 110, including but not limited to, lap joints, step lap joints, tabled splice joints, etc.

Referring now to FIG. 10, the composite sections 104a, 104b each may comprise multiple laminated plies (not shown) of a fiber reinforced polymer resin, such as carbon fiber epoxy, in which the outer edges 117 include ply drop-offs (not shown) forming tapered or ramp geometry. Similarly, the splice member 112 may be formed from multiple plies (not shown) of a fiber reinforced polymer resin which may be respectively aligned with the plies of the composite sections 104a, 104b. The splice member 112 may have a substantially V-shaped cross-section defining inclined or ramped surfaces 116 which may overlap and which may be bonded to corresponding tapered edges 117 on the outer adjoining ends of the composite sections 104a, 104b to form the splice joint 110. As previously noted, although a splice joint 110 has been illustrated, other splice configurations may be possible depending on the application.

Figure 11:
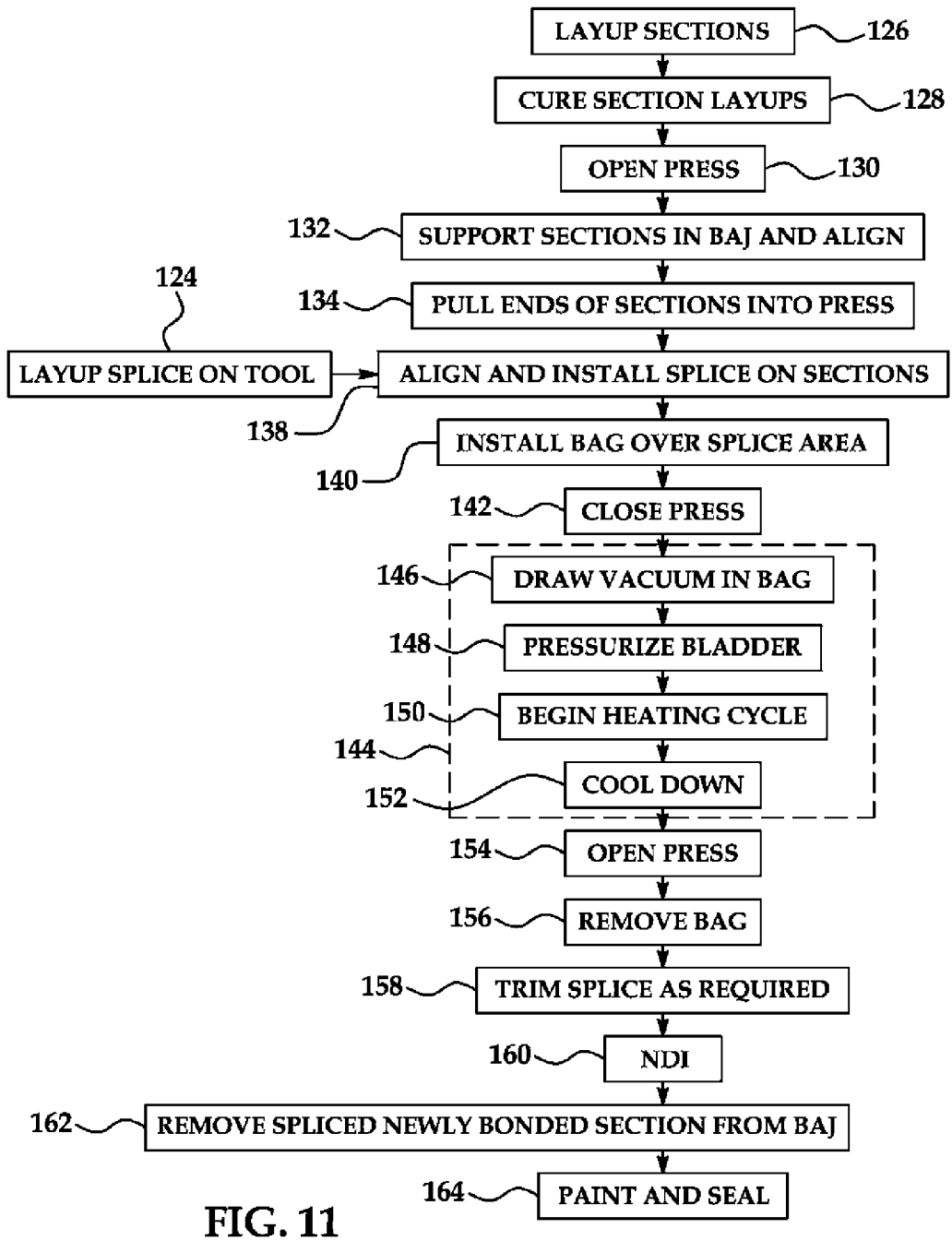
FIG. 11 is a simplified flow diagram illustrating a method for structural bonding of composite sections.

Attention is now directed to FIG. 11 illustrating the steps of a method for structural bonding of the composite sections 104a-104c (FIG. 1). Beginning at step 126, the composite sections 104a-104c (FIG. 1) may be laid up on a suitable tool (not shown) and may be then individually cured at step 128, using heat and pressure, typically within an autoclave (not shown). Next, at step 130, a bonding machine 186 (FIG. 1) may be opened in preparation for receiving the ends of two adjacent composite sections such as the first and second composite sections 104a, 104b (FIG. 1).

At step 132, the first and second composite sections 104a, 104b (FIG. 1) may be loaded into bond assembly jigs 184 (BAJ) (FIG. 1) and aligned with each other. Next, at 134, the ends of the composite sections 104a, 104b may be pulled into the bonding machine 186. After the splice member 112 (FIG. 1) has been laid up and formed over a tool (not shown) at step 124, the splice member 112 may be aligned and installed on the composite sections 104a, 104b (FIG. 1) at the splice joint 110, as shown at step 138.

At step 140, a vacuum bag may be installed over the splice area which may include the splice member 112 after which, at step 142, the bonding machine 186 may be closed. The green (uncured) splice member 112 may then be bonded to the ends of the composite sections 104a, 104b by a series of steps shown at step 144. Beginning at step 146, a vacuum may be drawn in the vacuum bag in order to partially consolidate the plies of the splice member 112 layup. Next, at step 148, a pressure bladder as described below may be pressurized to press the splice member 112 and composite sections 104a, 104b against a mandrel 194 (FIG. 13) thereby further consolidating the plies of the splice member 112 layup.

A heating cycle may be commenced at step 150 in which the composite sections 104a, 104b (FIG. 1) and the splice member 112 may be locally heated in order to cure the green splice member 112 and thereby bond the splice member 112 to the composite sections 104a, 104b to form the splice joint 110. Finally, at step 152, the splice member 112 (FIG. 1) may be cooled after which the bonding machine 186 may be opened at step 154. At step 156, the vacuum bag may be removed after which the splice member 112 may be trimmed as required in step 158. The resulting bonded splice joint 110 (FIG. 1) may be non-destructively inspected (NDI) at step 160 after which the structural member 104 may be removed from the bond assembly jigs 184. Depending upon the application, the completed structural member 104 may be painted and sealed at step 164. It should be noted here that steps 158-164 may be carried out in any desired order.

In the method embodiment described above in connection with FIG. 11, the composite sections 104a, 104b (FIG. 1) may be cured before the uncured splice member 112 may be applied to the splice joint 110. However, in other embodiments, it is contemplated that only portions of the composite sections 104a, 104b may be cured before the uncured splice member 112 may be applied to the splice joint 110. For example, as shown in FIG. 2, uncured portions 115 of the composite sections 104a, 104b spanning the splice member 112 may be in an uncured or partially cured ("staged") state at the time the splice member 112 may be applied to the joint 110, while remaining areas of the composite sections 104a, 104b (FIG. 1) may be in a cured state. In the alternative embodiment, the uncured portions 115 of the composite sections 104a, 104b may be co-cured with the uncured splice member 112.

FIG. 12 broadly illustrates components of a control system for the bonding machine 186. A controller 166, which may comprise a programmable logic controller (PLC) or a personal computer (PC), may use various software programs 178 to automatically carry out control functions in a pre-programmed manner. Operator controls and displays 180 allow operator access to the software programs 178 and form an interface with the controller 166 to allow adjustment of settings and display of process information. In certain embodiments, controller 166 may be coupled with the bond assembly jigs 184 (FIG. 1) to sense or control the position of the long composite sections 104a, 104b (FIG. 1) relative to each other. The controller 166 may control various components and systems on the bonding machine 186 including, but not limited to, heating/cooling systems 192, 196, bladder pressurization 174 and a bag vacuum 176. The bonding machine 186 may include a variety of sensors 182 that provide signals to the controller 166 such as temperatures and pressures as described below.

Figure 13:
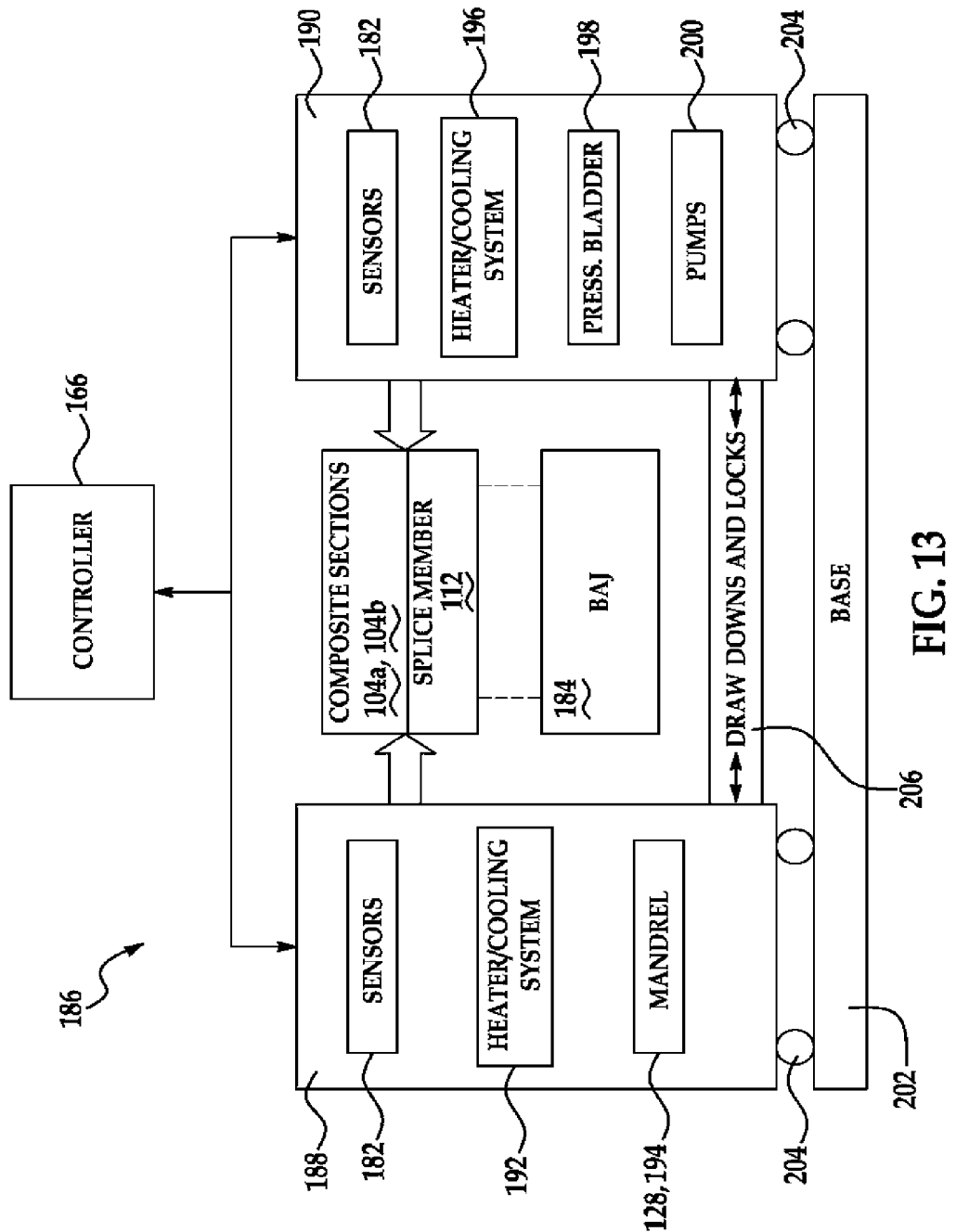
FIG. 13 is a functional block diagram of an apparatus for structural bonding of composite sections.

FIG. 13 is a functional block diagram of the bonding machine 186 which broadly comprises a first tool platform 188 and a second pressure platform 190. Platforms 188, 190 may be mounted for sliding or rolling movement by guides 204 on a common base 202 for linear horizontal movement toward and away from each other. As will be described in greater detail below, the platforms 188, 190 may be moved from an open position shown in FIG. 13 to a closed position shown in FIGS. 16 and 21 in which heat and pressure may be locally applied to the splice area comprising the splice member 112 and the ends of the assembled composite sections 104a, 104b while being supported by the bond assembly jigs 184. Locally-applied heat and pressure may structurally bond the splice member 112 to the composite sections 104a, 104b to create the bonded splice joint 110. The platforms 188, 190 may be drawn and locked into their closed positions using draw downs and locks 206. As shown in FIG. 13, the tool platform 188 may include sensors 182, a heating/cooling system 192 and a mandrel 194. Similarly, the pressure platform 190 may include sensors 182, a heating/cooling system 196, a pressure bladder 198 and pumps 200 for drawing a bag vacuum and pressurize the pressurize bladder 198.

Figure 14:
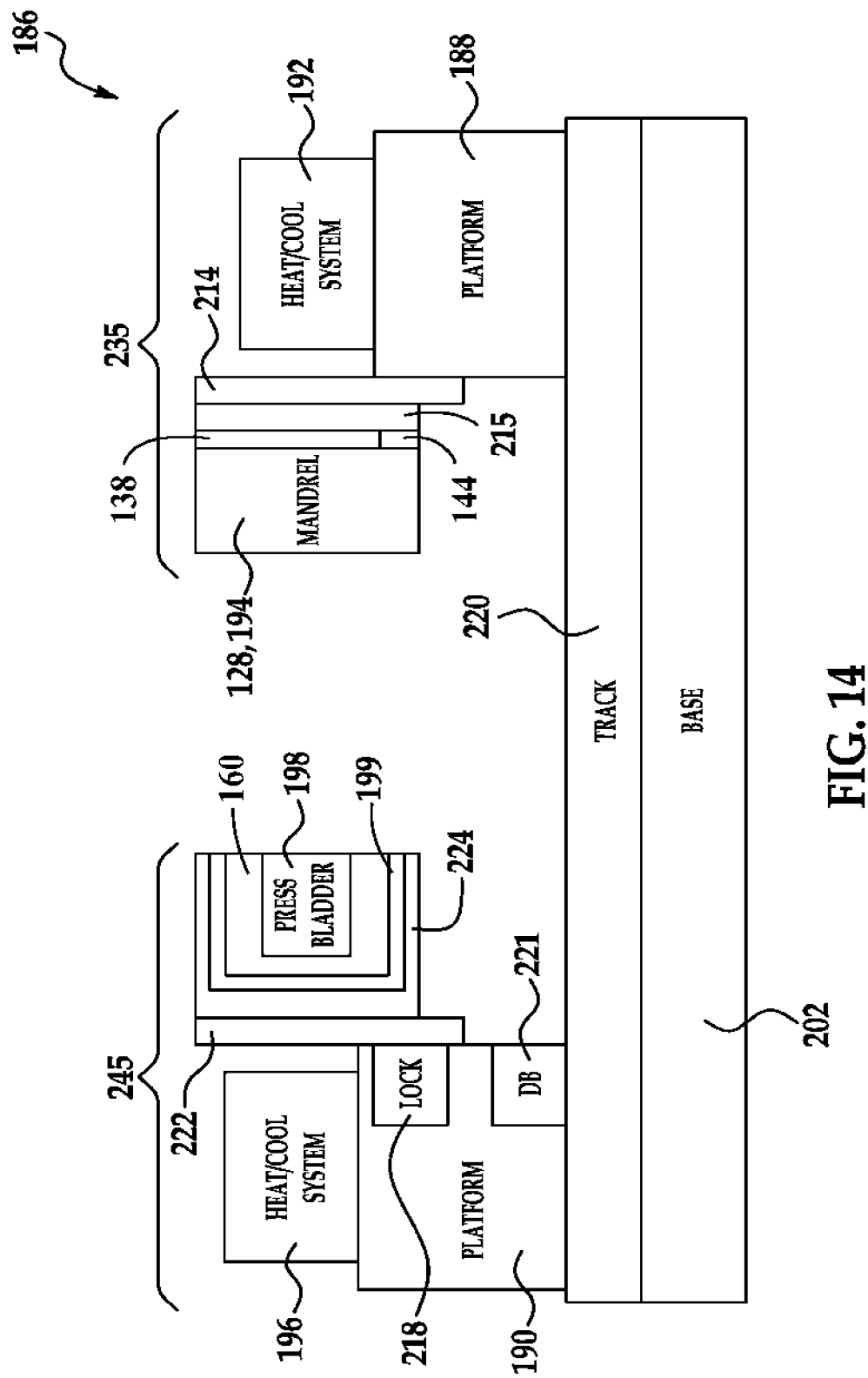
FIG. 14 is a block diagram of a bonding machine in an open position.
Figure 15:
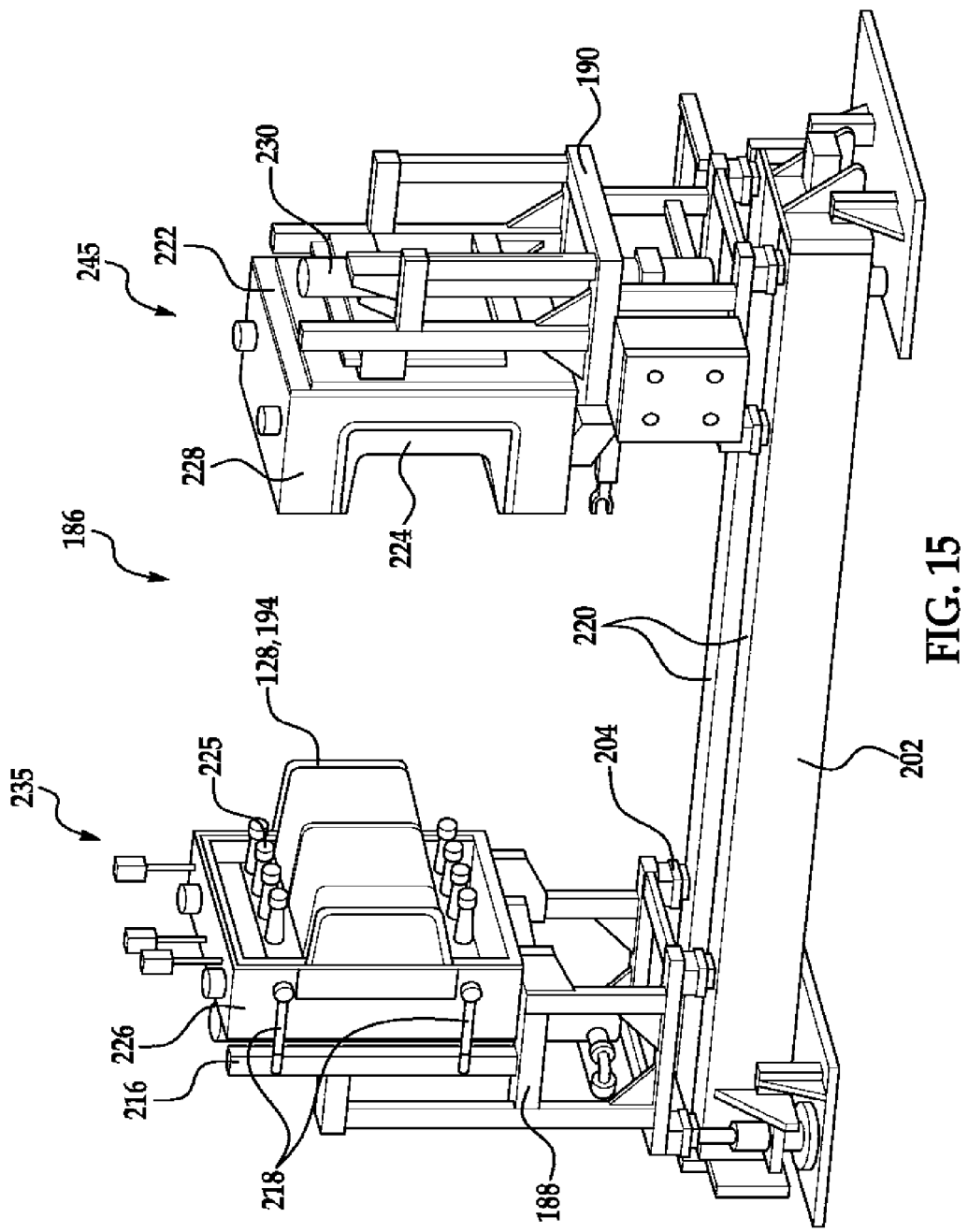
FIG. 15 is a perspective view of the bonding machines shown in FIG. 14.

Attention is now directed to FIGS. 13-15 which illustrate further details of the bonding machine 186. In a broad sense, the bonding machine 186 may include a tool tower 235 and a pressure tower 245 between which the assembled splice member 112 and composite sections 104a, 104b may be structurally bonded to form a bonded splice joint 110. The tool tower 235 may include a tool platform 188 mounted for linear horizontal movement on a base 202 by any suitable means. In the illustrated example, platform 188 may include feet 204 that may be guided by tracks 220. The bonding machine 186 may include a tool 128 which may comprise a mandrel 194.

Figure 43:
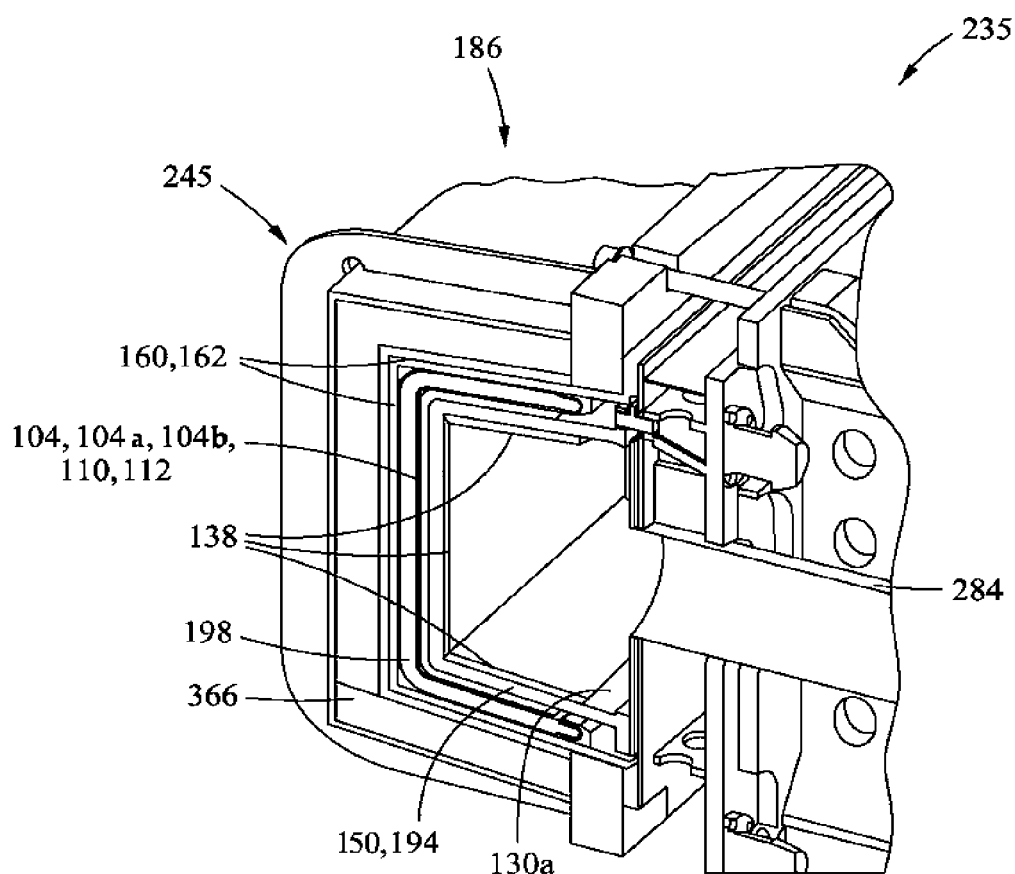
FIG. 43 is a section illustration of the bonding machine and splice joint taken along line 43-43 of FIG. 42 and illustrating a thermally conductive tool liner and a thermally conductive bladder liner mounted to the bonding machine.
Figure 44:
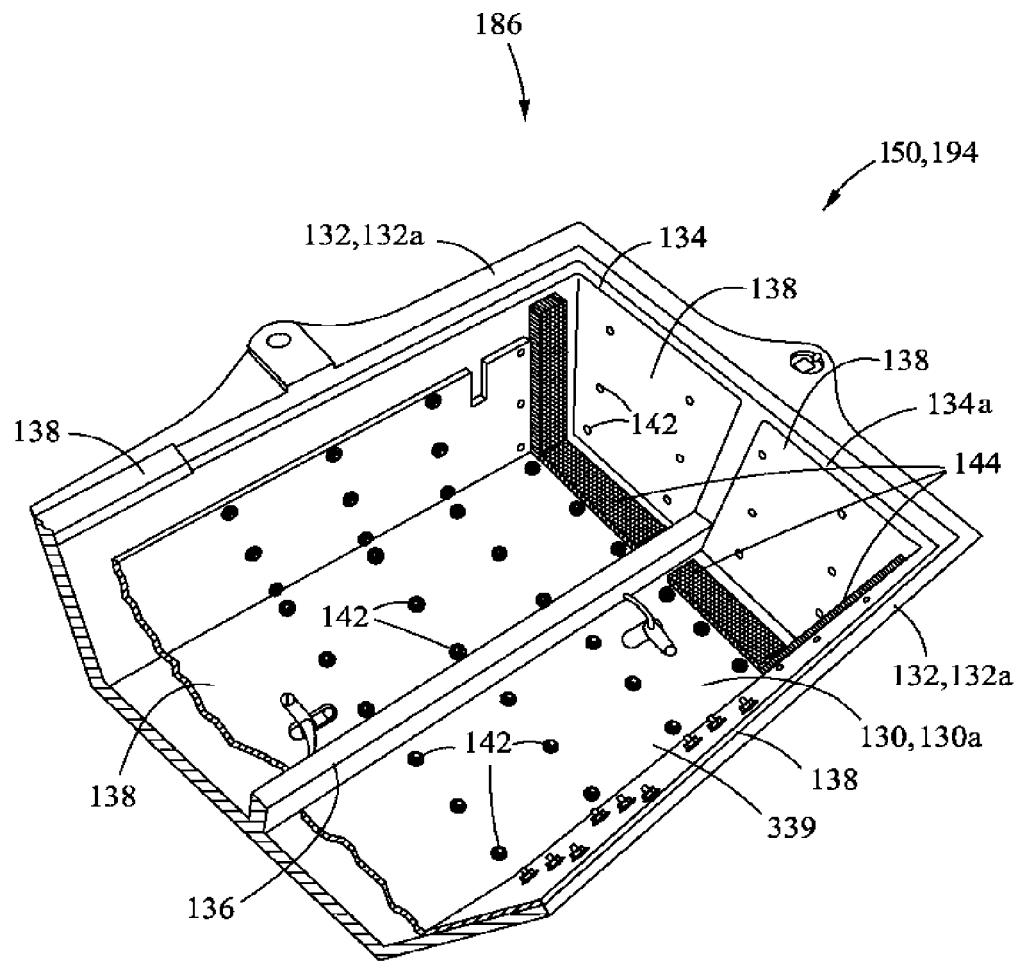
FIG. 44 is a perspective illustration of the mandrel having the tool liners mounted to inner surfaces of the mandrel.
Figure 45:
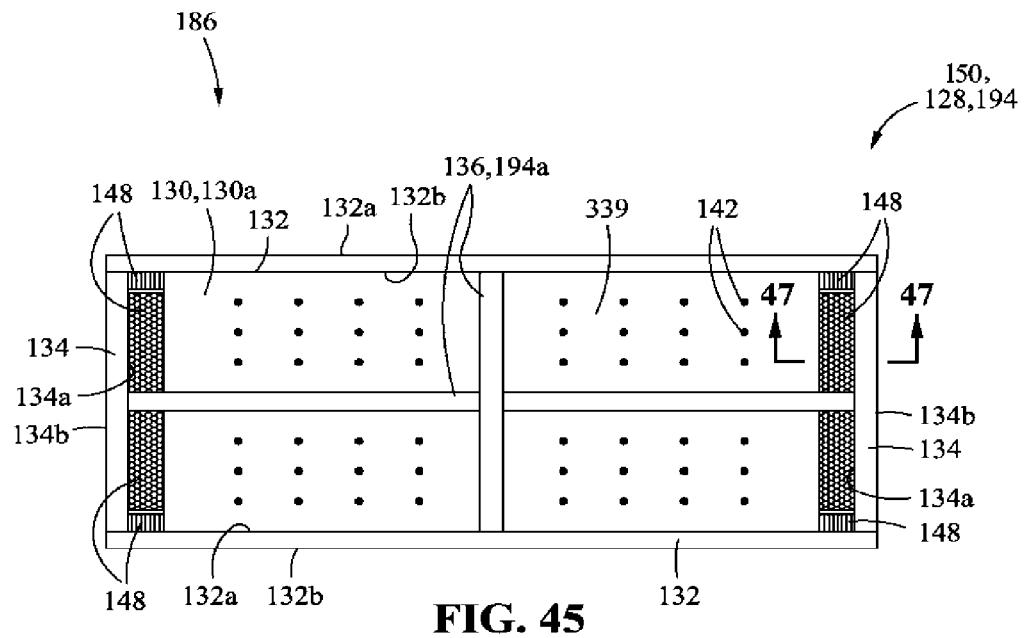
FIG. 45 is a plan view of the mandrel illustrating the tool liners and heat sinks mounted adjacent to end walls of the mandrel.

Referring briefly to FIGS. 14 and 43-46, shown is the mandrel 194 which, in an embodiment, may be hollow on one side thereof. The mandrel 194 may comprise a top wall 130 and a pair of side walls 132 disposed in spaced relation to one another and being bounded by a pair of end walls 134 having inner and outer surfaces 134a, 134b (FIG. 45). The mandrel 194 may include one or more stiffeners 136 which may extend between one or more of the side walls 132 and/or end walls 134. The mandrel 194 may be formed of any material suitable for maintaining a shape of the mandrel 194 under pressurization loads imposed by the pressure bladder 198. For example, the mandrel 194 may be formed of a metallic or non-metallic material.

In this regard, the mandrel 194 may be formed of Invar due to the favorably low coefficient of thermal expansion of Invar which may be comparable to the coefficient of thermal expansion of composite materials. However, the mandrel 194 may be formed of any suitable material including, without limitation, steel, steel alloys and composite material. The mandrel 194 may further include one or more tool liners 138 and/or heat sinks 144 which may be mounted at any location on the bonding machine 186 such as, without limitation, on the inner surfaces 130a, 132a, 134a of the mandrel 194. The heat sinks may be configured to increase heat input into areas of the mandrel by drawing heat from a heated medium for increasing heat input into the portions of the mandrel and/or into the composite sections. The heat sinks may be configured to reduce heat input into areas of the mandrel by circulating cooling medium (not shown) through the heat sink to draw heat therefrom. As may be appreciated, the heat sinks may be installed in any location for facilitating the uniform distribution along the mandrel and/or composite sections. In this manner, the first and second composite sections and the splice member may be uniformly heated during curing thereof as described in greater detail below and illustrated in FIGS. 42-51.

Referring to FIGS. 13-15, the tool 128 or mandrel 194 may be mounted on a mandrel base 215 which, in turn, may be secured to a platen plate 214. The platen plate 214 may be supported on the tool platform 188. The mandrel base 215 may be releasable from the platen plate 214 by means of a series of locking levers 225 to allow the mandrel 194 to be easily removed and/or replaced.

Figure 16:
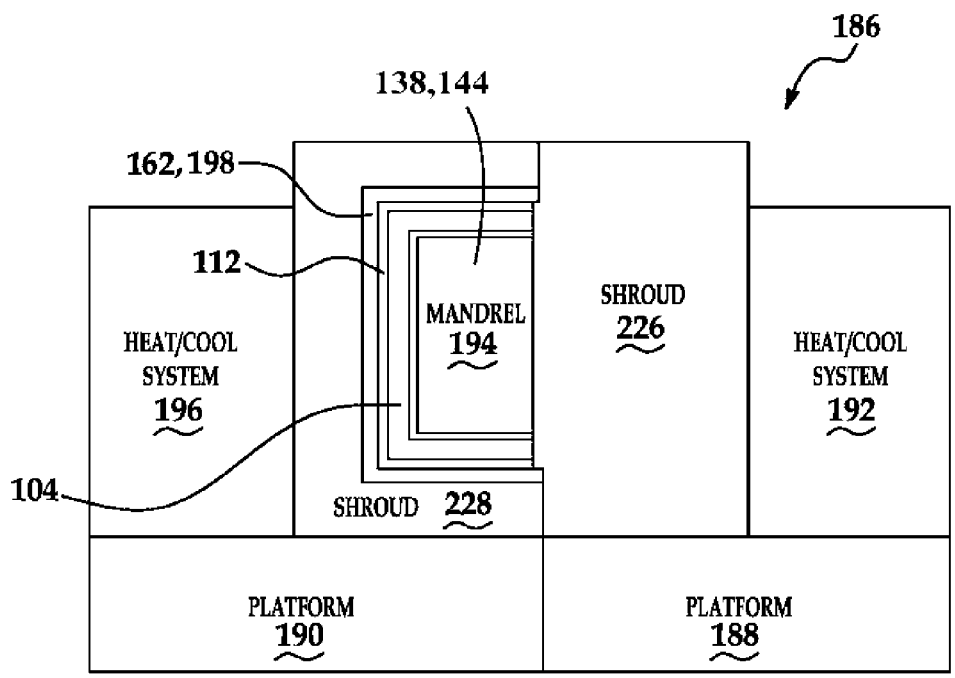
FIG. 16 is a block diagram of the bonding machine, shown in a closed position.

Referring to FIG. 14, the pressure tower 245 may include a pressure platform 190 which may also have feet engaging the tracks 220. An inflatable pressure bladder 198 may be held in a semi-rigid bladder frame 199 that may be secured to a bladder shroud 224. The shroud 224 may, in turn, be secured to a platen plate 222 mounted on the pressure platform 190. Heating/cooling systems 192, 196 may be respectively mounted on the traveling platforms 188, 190 for heating and cooling the mandrel 194 and the area surrounding the pressure bladder 198. Outer covers 226, 228 may be employed to protectively surround components on the tool and pressure towers 235, 245, respectively. An electric or other form of motor (not shown) may be used to power the platforms 188, 190 to travel along the track 220 between an open, part-loading/unloading position as shown in FIGS. 13 and 14, to a closed, part curing position as shown in FIG. 16. A draw bar 221 (FIG. 14) may be connected between the towers 235, 245 for drawing the platforms 188, 190 into a final closed position. Locking arms 218 may be used to lock the platforms 188, 190 together in their closed position.

Figure 17:
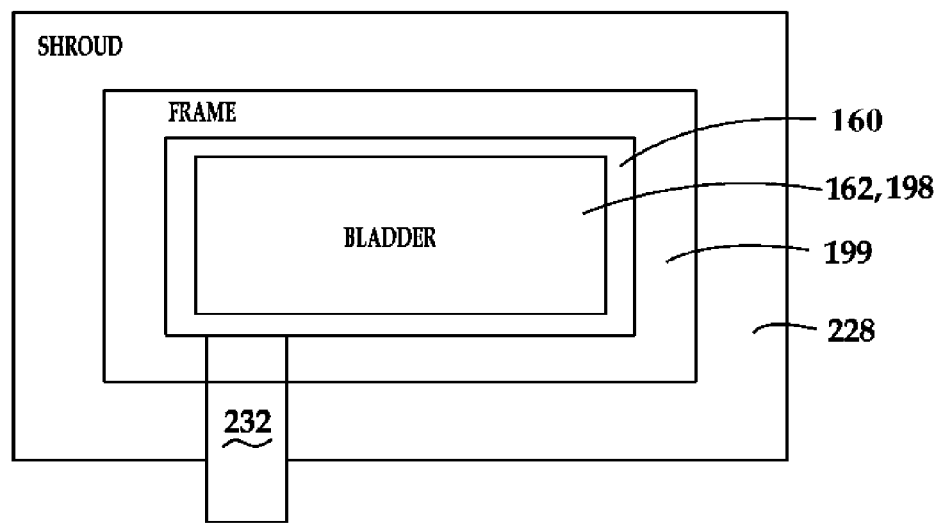
FIG. 17 is a block diagram of a pressure bladder.

Referring particularly to FIGS. 16-17, the pressure bladder 198 may have a cross-section that may be substantially C-shaped similar to the shape of the mandrel 194. The bladder 198 may be formed of any suitable material capable of withstanding temperatures and pressures for the particular application including, for example and without limitation, silicone rubber. A fluid fitting 232 may allow pressurized fluid such as a gas or a liquid to enter and exit the bladder 198. Referring briefly to FIGS. 16-17 and 43, a bladder liner 160 having a heater element 162 may be installed in thermal contact with the pressure bladder 198 on a side thereof opposite the composite splice joint 110. The heater element 162 may heat the bladder liner 160 which may, in turn, conductively heat the pressure bladder 198 for heating the splice joint 110 in a uniform manner as described in greater detail below and illustrated in FIGS. 42-51.

Figure 18:
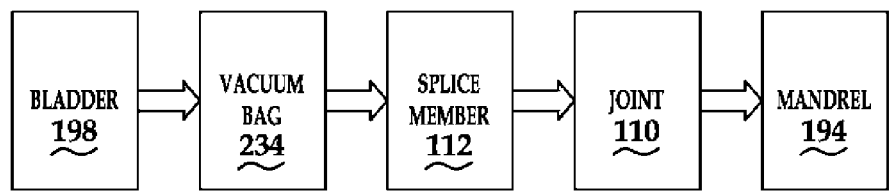
FIG. 18 is a block diagram illustrating the installation of a vacuum bag and a splice member on the bonding machine.

Attention is now directed to FIG. 18 which illustrates steps for readying and closing the bonding machine 186 (FIG. 14) in preparation for a bonding operation. The splice member 112 may be first applied over the joint 110 between the composite sections 104a, 104b (FIG. 1) which may be held by the previously-described bond assembly jigs 184 (FIG. 1). Next, with the bonding machine 186 (FIG. 14) still open, a vacuum bag 234 may be applied over the splice member 112. Both the splice member 112 and the vacuum bag 234 may extend the full thickness of the composite sections 104a, 104b (FIG. 1) which may include ply buildups (not shown) on each side of the joint 110. With the splice member 112 and vacuum bag 234 having been installed, the bonding machine 186 may be closed by moving the platforms 188, 190 toward each other. As previously mentioned, a draw bar 221 (FIG. 14) may be employed if necessary to pull the platforms 188, 190 together until locking arms 218 (FIG. 15) can be rotated to lock the position of the mandrel 194 relative to the pressure bladder shroud 224.

Figure 19:
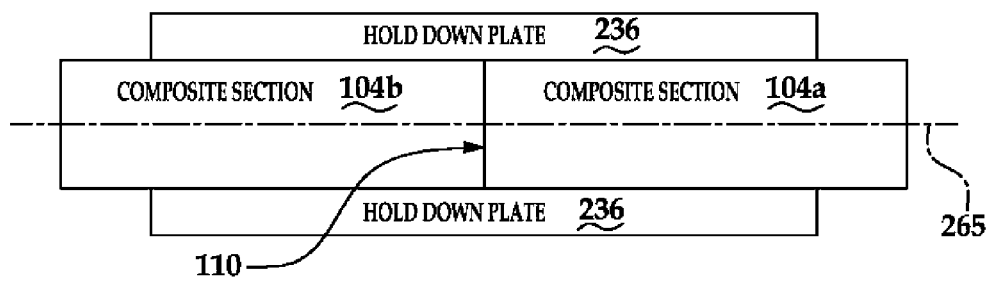
FIG. 19 is a block diagram showing a pair of hold down plates used to hold the composite sections during the curing process.

Referring now to FIG. 19, during the curing process in which the composite sections 104a, 104b may be locally heated, the composite sections 104a, 104b may experience movement along their longitudinal axes 265. In order to achieve final assembly requirements, this movement may be substantially reduced by holding the composite sections 104a, 104b using a pair of hold down plates 236 which span the splice joint 110 and clamp the adjacent ends of the composite sections 104a, 104b together. The hold down plates 236 may be fixed to abrasive, excess edge sections (not shown) on the top and bottom of the composite sections 104a, 104b overlying the splice joint 110 and rigidly connecting the composite sections 104a, 104b. Alternatively, each one of the composite sections may be secured in position on a lay up mandrel (not shown) to prevent movement of the composite sections along their longitudinal axes during the curing process.

Figure 20:
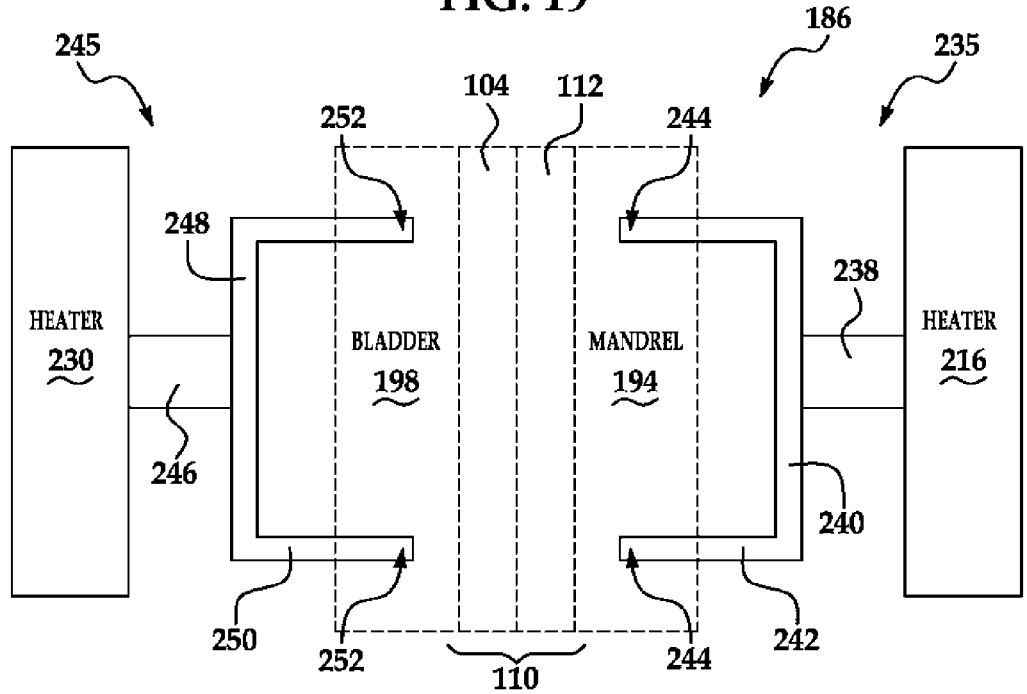
FIG. 20 is a block and diagrammatic view illustrating heating systems used to heat the mandrel and bladder.

Attention is now directed to FIG. 20 which illustrates further details of the heating/cooling systems 192, 196 (FIG. 14) that may be configured to heat the area of the splice joint 110 to a temperature sufficient to result in the curing of the slice member 112 and to cool the splice member 112 after curing. On the side of the tool tower 235, a heating element 216 may heat a medium that may be delivered through a supply duct 238 to a manifold 240 which may route the heated medium to distribution ducts 242. The distribution ducts 242 may supply the heated medium to nozzles 244 which may direct heated medium onto the inside surface of the mandrel 194 which may be hollow on one side thereof. As used herein, "medium" and "heated medium" is intended to include a variety of flowable mediums including, without limitation, air and other gases as well as fluids including oil. Other forms of heating such as, without limitation, induction heating may also be possible.

On the side of the pressure tower 245, the heating element 230 may heat a medium 152 (FIG. 23) that may be delivered through a supply duct 246 to a manifold 248 which may route the heated medium 152 (FIG. 23) to distribution ducts 250. The distribution ducts 250 may deliver the heated medium 152 (FIG. 23) to nozzles 252 which may direct the medium to the area surrounding the pressure bladder 198 and the outside mold line of the splice member 112.

Figure 21:
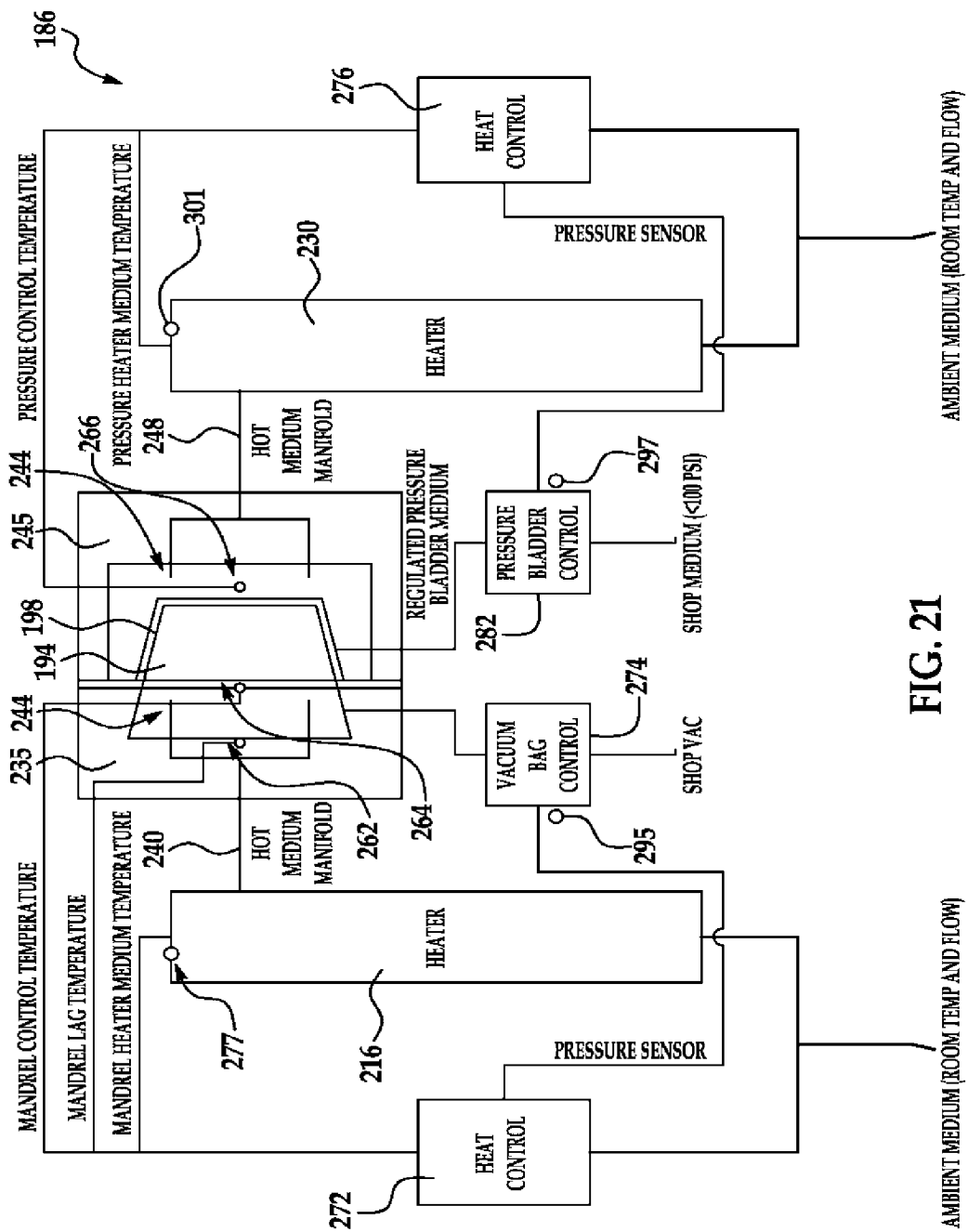
FIG. 21 is a block diagram illustrating components of control systems forming part of the bonding machine.

FIG. 21 illustrates additional components of the heating/cooling systems 192, 196 as well as other systems such as a vacuum bag control 274 and bladder pressure control 282. Ambient medium (not shown) may be drawn through the heating element 216 and distributed by the manifold 240 to the nozzles 244 in order to heat the mandrel 194. The heating element 216 may be controlled by a heat control 272, based in part on data received from a vacuum bag pressure sensor 295, a mandrel heater medium temperature sensor 277, a mandrel lag temperature sensor 262 and a mandrel control temperature 264. Vacuum pressure within the vacuum bag 234 (FIG. 18) may be controlled by a vacuum bag control 274.

On the side of the pressure tower 245, ambient medium may be drawn through the heat element 230 to the hot medium manifold 248 which may distribute the heated medium to the nozzles 244. Pressure applied to the pressure bladder 198 may be controlled by a pressure control 282 which may include a pressure sensor 297 that may provide pressure data to the heat control 276. The medium flowing through the heater 230 may further be controlled by the control 276 based on data generated by a pressure control temperature sensor 266 and a pressure heater temperature sensor 301.

Figure 22:
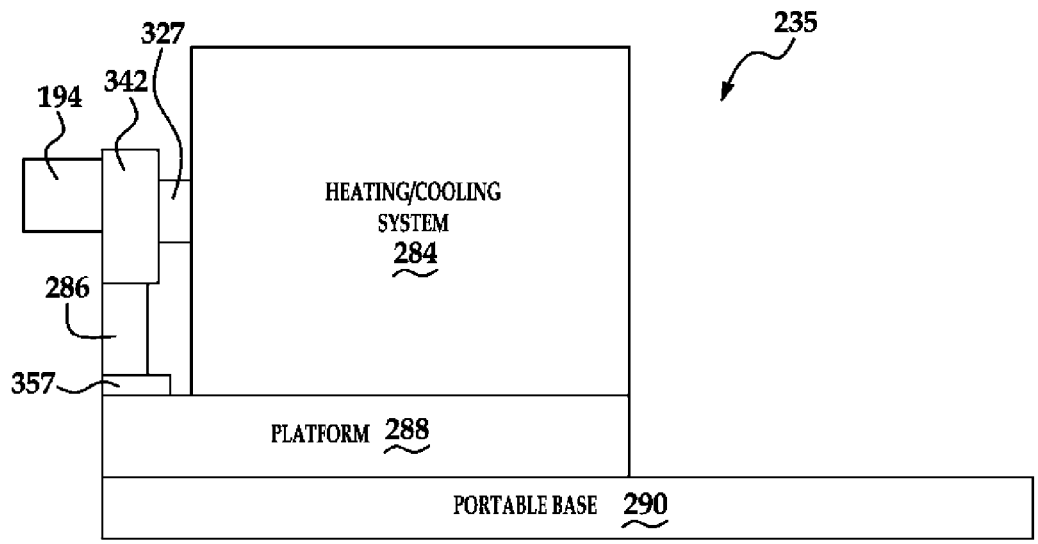
FIG. 22 is a diagrammatic illustration of an alternate form of the tool tower, and showing a modular heating/cooling system.

Attention is now directed to FIG. 22 which illustrates an alternate embodiment of the tool tower 235. In the example shown, a self-contained, modular heating/cooling system 284 may be supported by rails (not shown) on a traveling platform 288. The platform 288 may be linearly displaceable on a portable base 290. The mandrel 194 may be secured to a mandrel base 342 which may be removably supported on a mandrel carrier 286. The mandrel carrier 286 may be removably mounted on supports 357 positioned on the top of the platform 288. Thus, the mandrel carrier 286 may be easily removed from the platform 288 and the mandrel 194 and mandrel base 342 may be removed from the mandrel carrier 286. The heating/cooling system 284 may include medium supply and return ducts 318 (FIG. 23) that may be releasably coupled with the mandrel 194 by releasable connections 327 as described in greater detail below.

Figure 23:
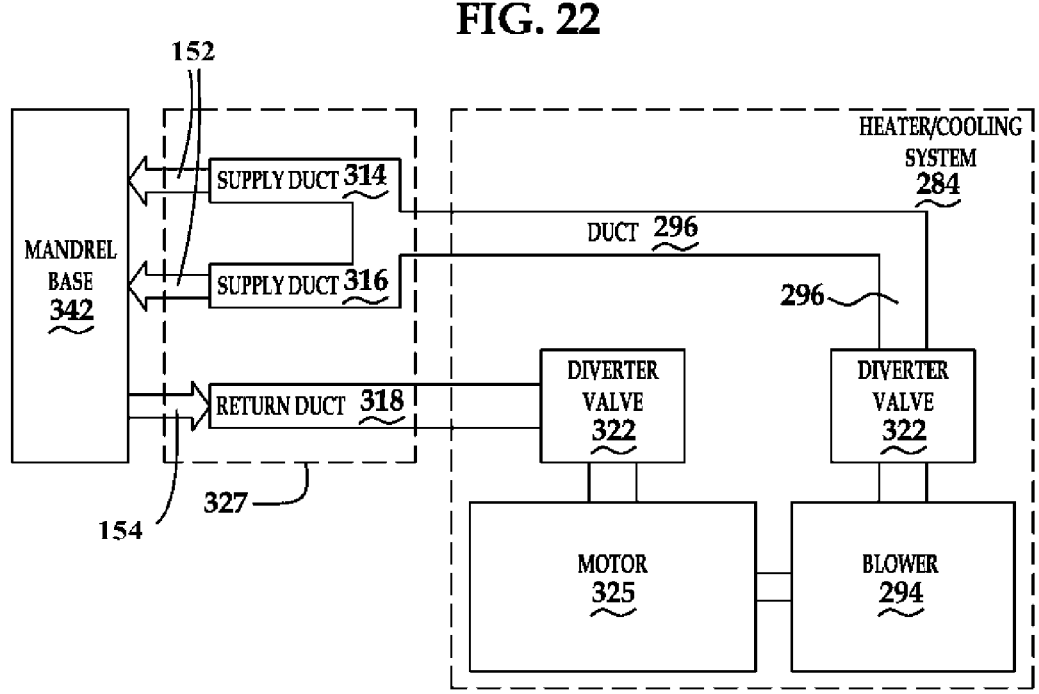
FIG. 23 is a block diagram illustrating additional components of the modular heating and cooling system shown in FIG. 22.
Figure 24:
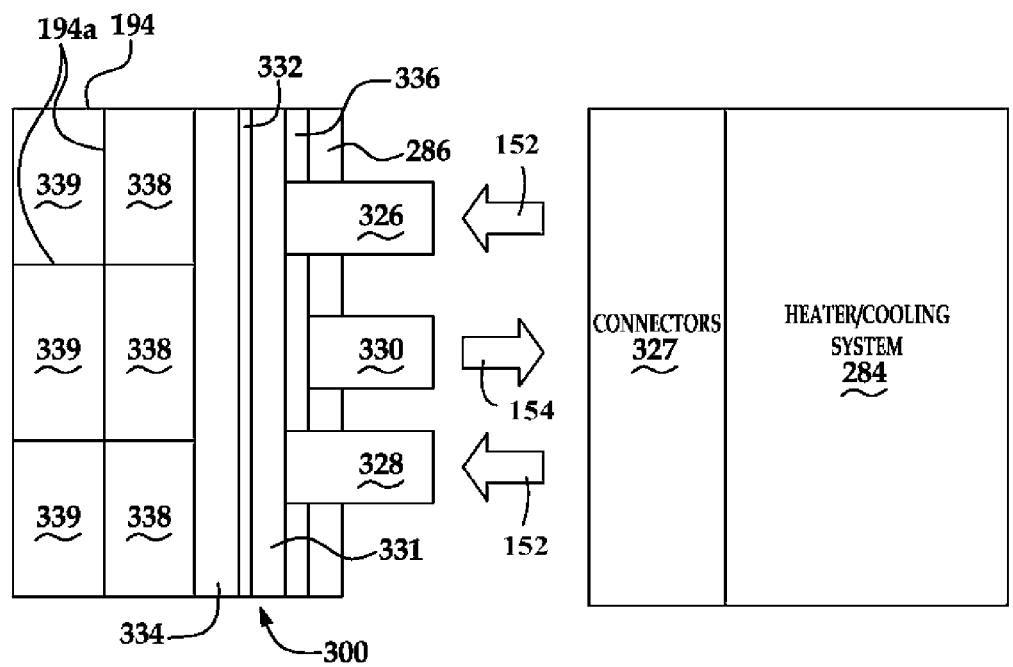
FIG. 24 is a block diagram illustrating connections between a mandrel assembly and the modular heating and cooling system.
Figure 28:
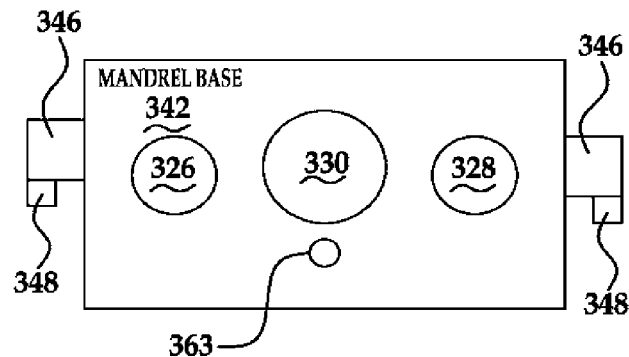
FIG. 28 is a block diagram illustrating additional components of the mandrel assembly.

Additional details of the heating/cooling system 284 are shown in FIGS. 22-25. Blower drive motor 325 may drive a blower 294 which may move the medium through a heating element 216 and then through a duct 296 to a pair of hot medium supply ducts 314, 316. The hot medium supply ducts 314, 316 may be respectively coupled with inlet connections 326, 328 (FIG. 28) passing through the back of the mandrel base 342. The heated medium 152 supplied through inlet connections 326, 328 may be delivered to a nozzle plenum assembly 300 (FIG. 24). Medium 154 returning from the nozzle plenum assembly 300 may pass through a return medium inlet connection 330 of the nozzle plenum assembly 300 and may be delivered via a return duct 318 to a diverter valve 322.

FIG. 24 illustrates further details of the nozzle plenum assembly 300. The nozzle plenum assembly 300 may be secured to the back of the mandrel 194. The nozzle plenum assembly 300 may include a plenum frame 334 to which box-shaped, perforated nozzles 338 may be attached. The perforated nozzles 338 may extend into compartments or zones 339 in the tool 128 that may be defined by partial partition walls 194a or the side walls, ends walls and stiffeners 136 of the mandrel 194. Each of the nozzles 338 may be secured to the plenum frame 334 with fasteners (not shown). Medium inlet connections 326, 328 may be secured to a plate 331 which may be fixed to the plenum frame 334. The return medium connection 330 may be mounted on a plate 336 that may include openings (not shown) through which the connections 326, 328 may extend. Incoming heated medium 152 to inlet connections 326, 328 may pass through the nozzles 338 which may deliver the heated medium 152 to the inner surfaces 130a, 132a, 134a of the top wall 130, side walls 132 and end walls 134 of the mandrel 194 via heating of the tool liner 138 as described in greater detail below and illustrated in FIGS. 42-51. In FIG. 24, return medium 154 may pass through the connection 330 and 327 back to the diverter valve 322 (FIG. 23).

Figures 25, 26:
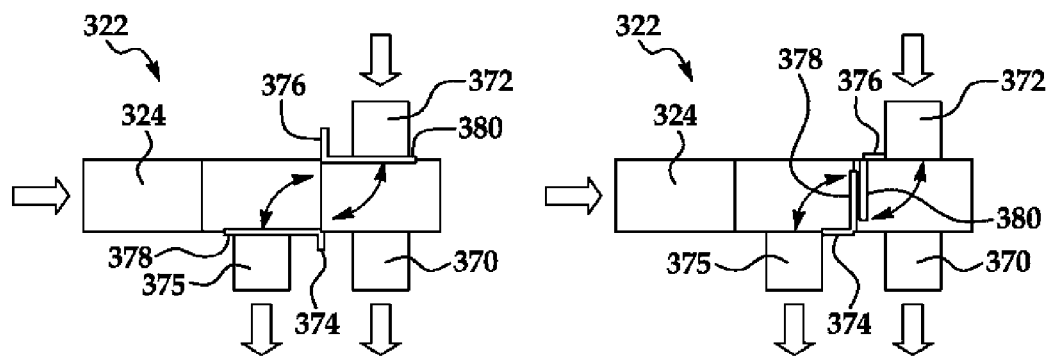
FIG. 25 is a block diagram of a diverter valve forming part of the modular heating and cooling system, wherein the valve has been switched to a heating mode.
FIG. 26 is a block diagram similar to FIG. 25, showing the valve switched to a cooling mode.
Figure 27:
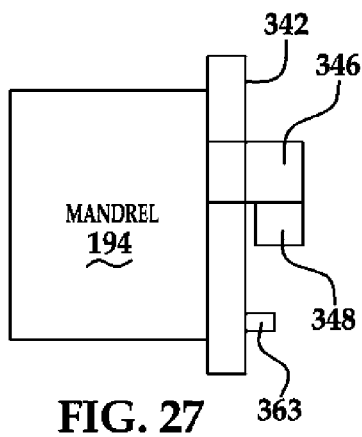
FIG. 27 is a block diagram illustrating components of the mandrel assembly.

Referring to FIGS. 25-26, the diverter valve 322 may include a pair of hinged valve members 378, 380 respectively controlled by arms 374 and 376. A cool medium inlet 372 may be selectively opened to allow cool medium to flow into the valve 322. In the condition shown in FIG. 26, valve 380 may be closed and valve 378 may be opened to allow return medium 154 received through the inlet 324 and to exit through the medium outlet 370 and thereby re-circulate during a heating cycle. The valve member 380 may close off the cool medium inlet 372 during the heating cycle.

FIG. 26 illustrates the condition of the diverter valve 322 when cool medium may be delivered to the mandrel 194 during a cooling cycle. Valve 378 may be moved to a second closed position which may divert the return medium received through inlet 324 out through a medium vent 375. Valve member 380 has also been moved to its open position allowing cool medium to enter through the medium inlet 372 and pass through the medium outlet 370 for delivery to the mandrel 194.

Figure 29:
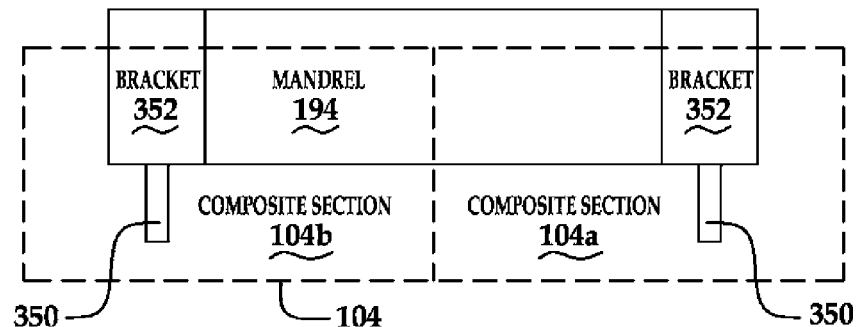
FIG. 29 is a block diagram illustrating details of the mandrel useful in indexing the spar sections.
Figure 30:
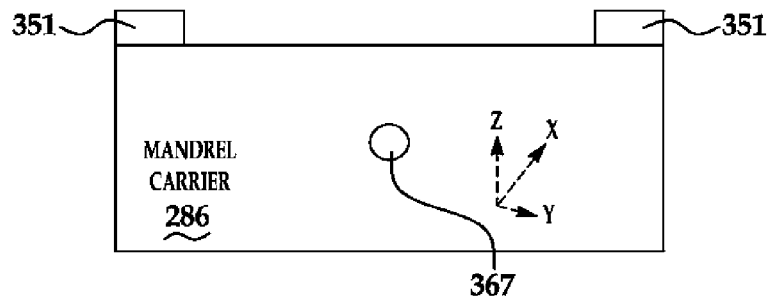
FIG. 30 is a block diagram of the mandrel carrier.

Attention is now directed to FIGS. 26-30 which illustrate the mandrel 194 and mounting of the mandrel base 342 on the mandrel carrier 286. Pins 351 (FIG. 30) on the mandrel carrier 286 may be received within the sockets 348 (FIGS. 27 and 28) secured to brackets 346 fixed to the mandrel base 342. A position limiting pin 363 on the back side of the mandrel base 342 may provide a third contact point between the mandrel base 342 and the mandrel carrier 286. The positioning pin 363 may engage a stop 367 (FIG. 30) on the mandrel carrier 286. Ball joint connections formed between the sockets 348 and the pins 351 may allow the mandrel 194 and the mandrel base 342 to expand along Y and Z axes shown in FIG. 30 while the limiting pin 363 may restrain such movement along the X axis. The mandrel base 342 may be configured to minimize deflection and react the pressurization of the pressure bladder through the mandrel 194. As shown in FIG. 29, the mandrel 194 may include end brackets 352 each provided with a retaining pin 350. The retaining pins 350 may be received within openings (not shown) in the composite sections 104a, 104b in order to maintain the composite sections 104a, 104b in aligned registration during the bonding process.

Figure 31:
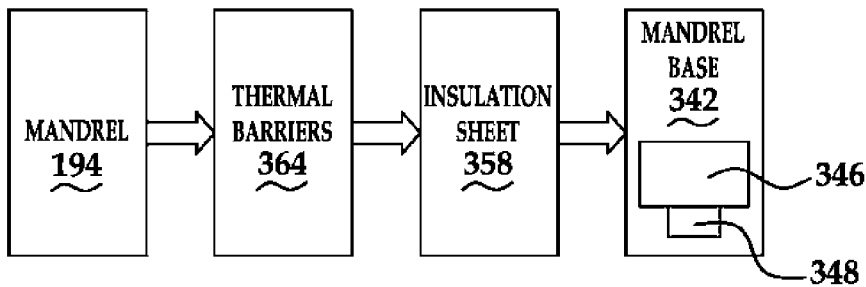
FIG. 31 is a block diagram illustrating the relationship between components of the mandrel assembly and mandrel base.

Referring to FIG. 31, the mandrel 194 may be secured to the mandrel base 342 using fasteners (not shown). Insulation 358 along with spaced-apart thermal barriers 364 may be sandwiched between the mandrel 194 and the mandrel base 342 in order to insulate the mandrel 194 from the mandrel base 342 to retain heat within the mandrel 194.

Figure 32:
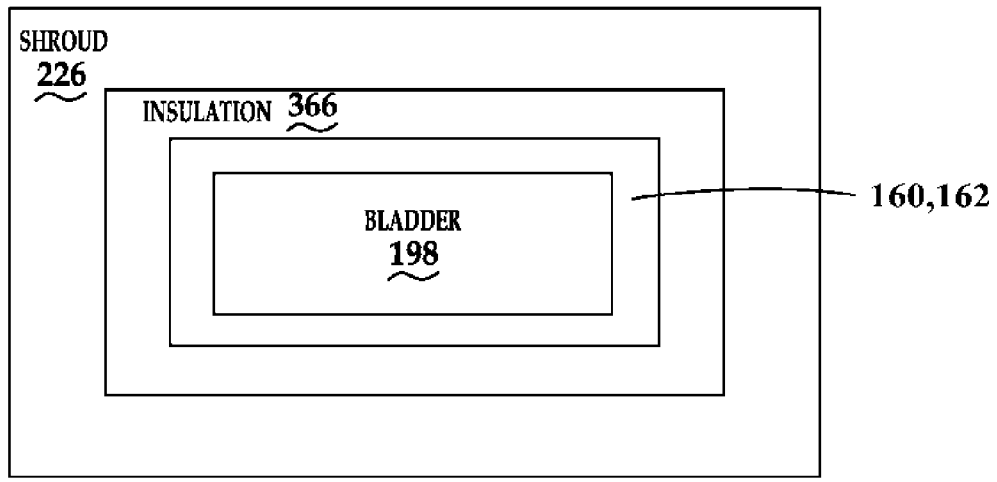
FIG. 32 is a block diagram of a bladder and shroud assembly.

FIG. 32 illustrates the use of insulation 366 surrounding the bladder 198 which may function to assist in retaining heat in the area of the splice joint 110 (FIG. 10) during the curing process. In this embodiment, heat required for curing of the splice member 112 (FIG. 10) may be provided only from the tool side (tool tower 235 in FIG. 15) using the heating system 284 previously described in connection with FIG. 23. In some applications, it may be necessary or desirable to place the heater element 162 on a bladder liner 160 between the pressure bladder 198 and the surrounding insulation 366 as described in greater detail below.

Figure 33:
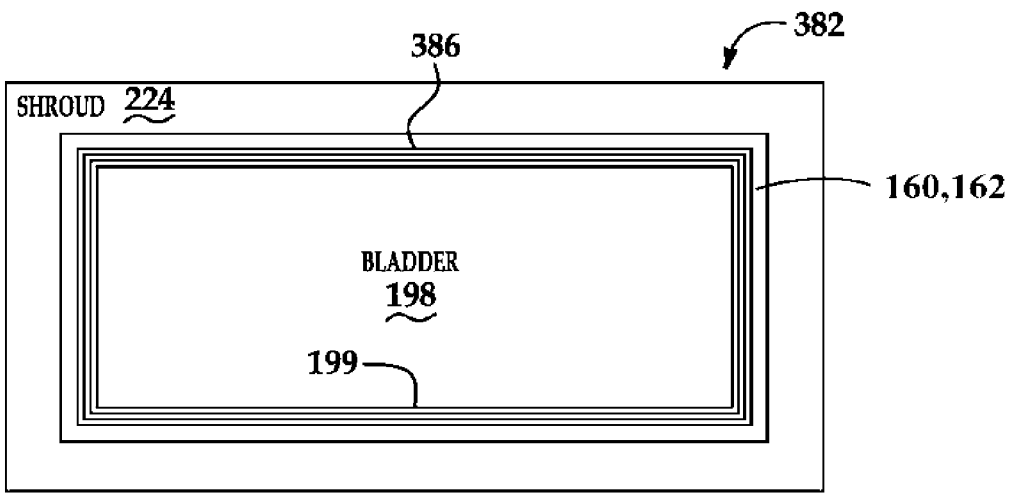
FIG. 33 is a block diagram showing a removable bladder and frame.

Referring now to FIG. 33, shown is a bladder assembly 382 which may be either removable or permanently fixed in position in the pressure tower 245. The bladder assembly 382 may include an inflatable pressure bladder 198. The heater element 162 may be mounted on the bladder liner 160 which may be in thermal contact with the bladder 198. The edges of the pressure bladder 198 may be secured to a semi-rigid frame 199 which may be formed of a semi-flexible material. The bladder frame 199 may be releasably held in the bladder shroud 224 by a series of retainers 386 which may hold the frame 199 in snap fit relationship allowing the bladder assembly 382 to be easily removed and/or replaced.

Figure 34:
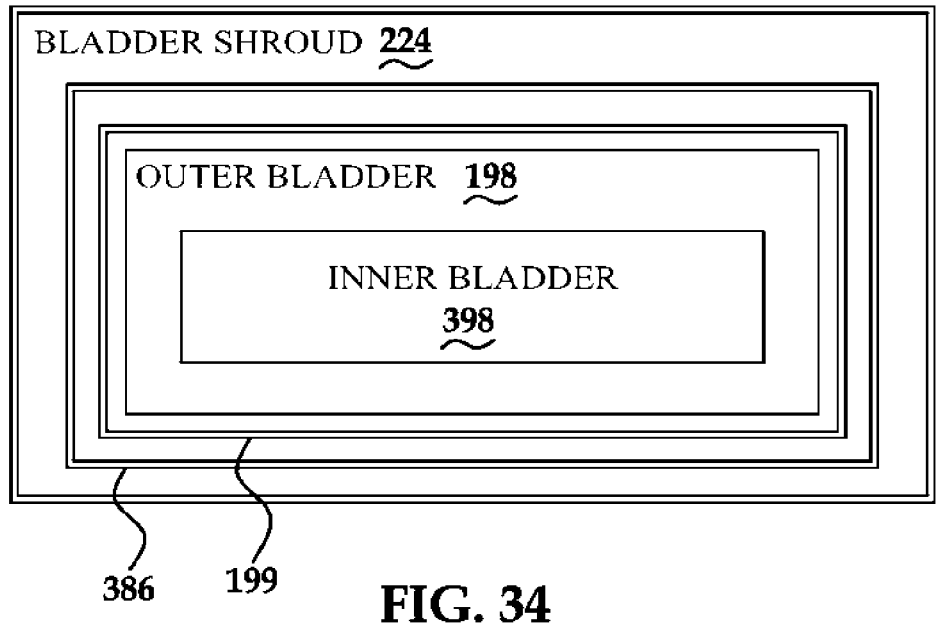
FIG. 34 is a block diagram of a dual pressure bladder.
Figure 35:
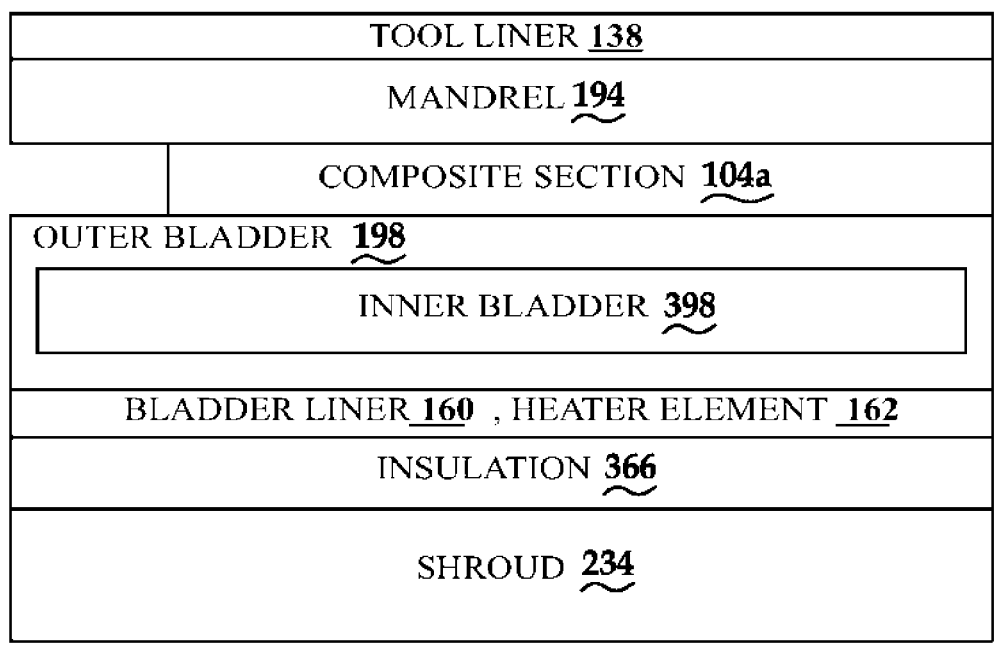
FIG. 35 is a block diagram illustrating the pressure bladder for applying pressure to composite sections.

The pressure bladder 198 may be a single bladder or may comprise a redundant, double bladder of the type shown in FIGS. 33 and 34. The bladder frame retainers 386 may be secured to the bladder shroud 224 and may have a substantially circular cross section. The bladder frame 199 may be formed of a semi-rigid material such as reinforced silicone and may include a circular groove (not shown) along its periphery which receives the retainer 386 in a snap fit relationship. A second inflatable inner bladder 398 may be positioned inside the first outer pressure bladder 198 for redundancy in the event that the pressure bladder 198 develops a leak. FIG. 35 illustrates the use of the insulation 366 to retain the heat that may be generated through the mandrel 194 where heating may be provided only on the tool side of the bonding machine 186. As was indicated above, the heater element 162 may be mounted on the bladder liner 160 which may be in thermal contact with the bladder 198.

Figure 36:
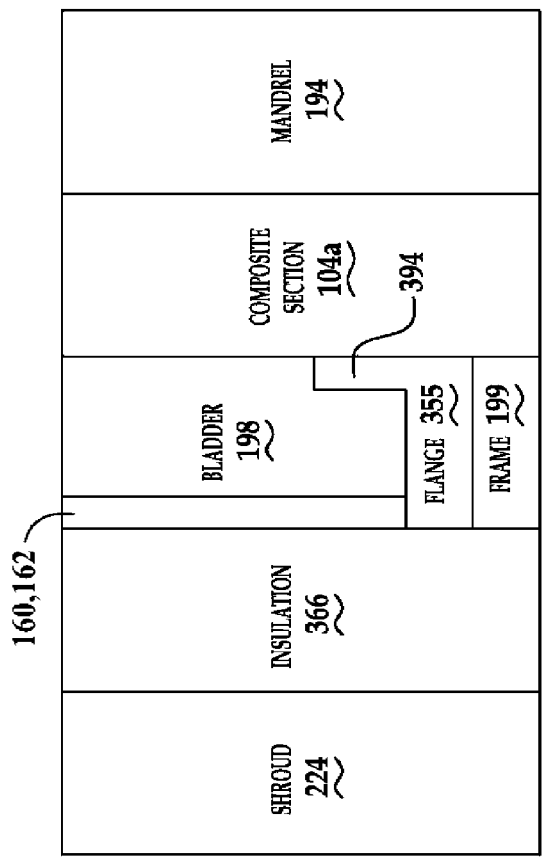
FIG. 36 is a block diagram illustrating an alternate form of a frame useful in holding composite sections in place during cure.

Attention is now directed to FIG. 36 which illustrates an alternate embodiment of a bladder frame 199 that may eliminate the need for use of the hold down plates 236 previously described in connection with FIG. 19. The pressure bladder 198 may be attached to the bladder frame 199 supported on the shroud 224 along with the insulation 366. The pressure bladder 198 may bear against the composite section 104a which may be captured between the pressure bladder 198 and the mandrel 194. The frame 199 may have a rigid flange 355 which may include a portion 394 overlying and bearing against the composite section 104a. The flange 355 may assist in bagging and may apply sufficient force against the composite section 104a to hold down composite section 104a against movement thereby eliminating the need for the hold down plates 236.

Figure 37:
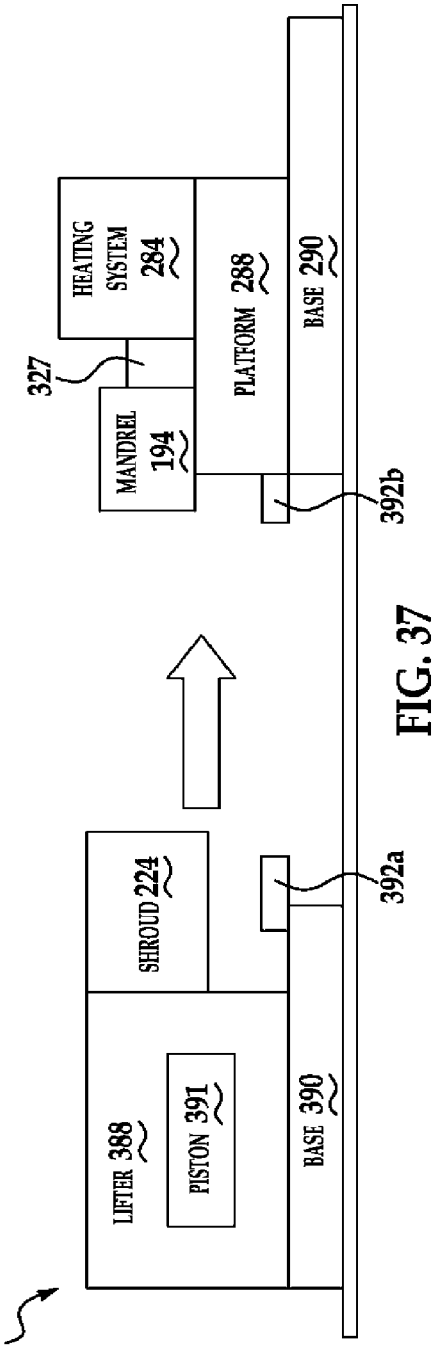
FIG. 37 is a block diagram illustrating a portable pressure shroud cart in relation to the tool platform.

Attention is now directed to FIG. 37 which illustrates the use of a shroud cart 388 to position the shroud 224 relative to the mandrel 194. The shroud cart 388 may be manually positioned in the work area. After being raised to a working height, the shroud cart 388 may be moved toward the mandrel 194. The cart 388 may include a portable base 390 mounted on rollers (not shown) and a lifting mechanism 388 powered by an actuator piston 391. The lifting mechanism 388 may be used to lift the shroud 224 to the desired height while the portable base 390 may be used to move the shroud 224 into the position shown in FIG. 37 in readiness for a bonding operation. The lifting mechanism 388 may be compliant to allow subtle adjustments to the shroud position without imparting load onto the composite sections or the mandrel 194. Locating devices 392a, 392b on the shroud 224 and the platform 288 ensure that the shroud 224 and the mandrel 194 may be in aligned relationship to each other when the shroud 224 has been moved into its closed position.

Figure 38:
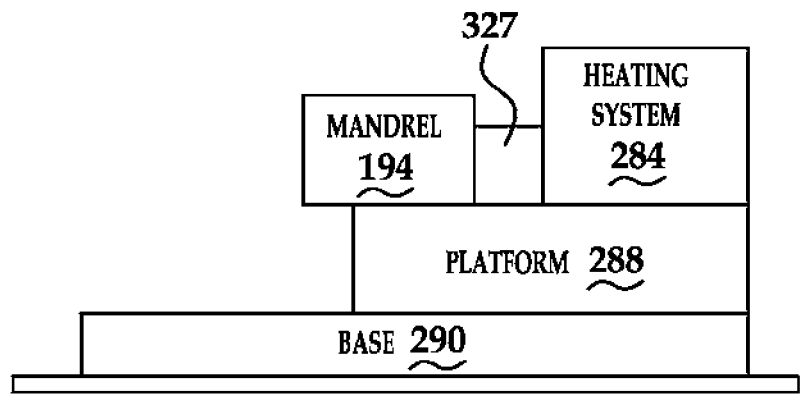
FIG. 38 is a block diagram illustrating the tool platform in a retracted position.
Figure 39:
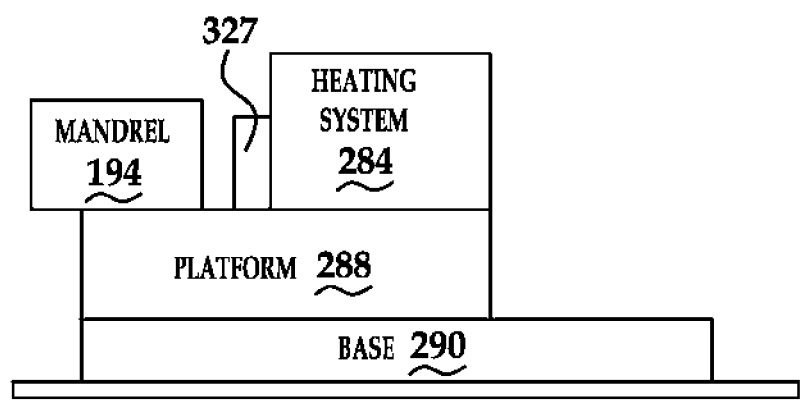
FIG. 39 is a view similar to FIG. 38 but showing the tool platform having been moved to a forward position and the mandrel assembly having been disconnected from the heating/cooling system in preparation for removal of the mandrel carrier.

FIGS. 38 and 39 illustrate the modular nature of the mandrel 194 and the heating system 284. As shown in FIG. 38, the platform 288 may be in a retracted position and the mandrel 194 may be coupled with the heating system 284. In order to remove and/or replace the mandrel 194, the platform 288 may be moved to its forward position on the base 290 as shown in FIG. 39. Then, the heating system 284 may be disconnected from the mandrel 194 using the releasable connections 327.

Figure 40:
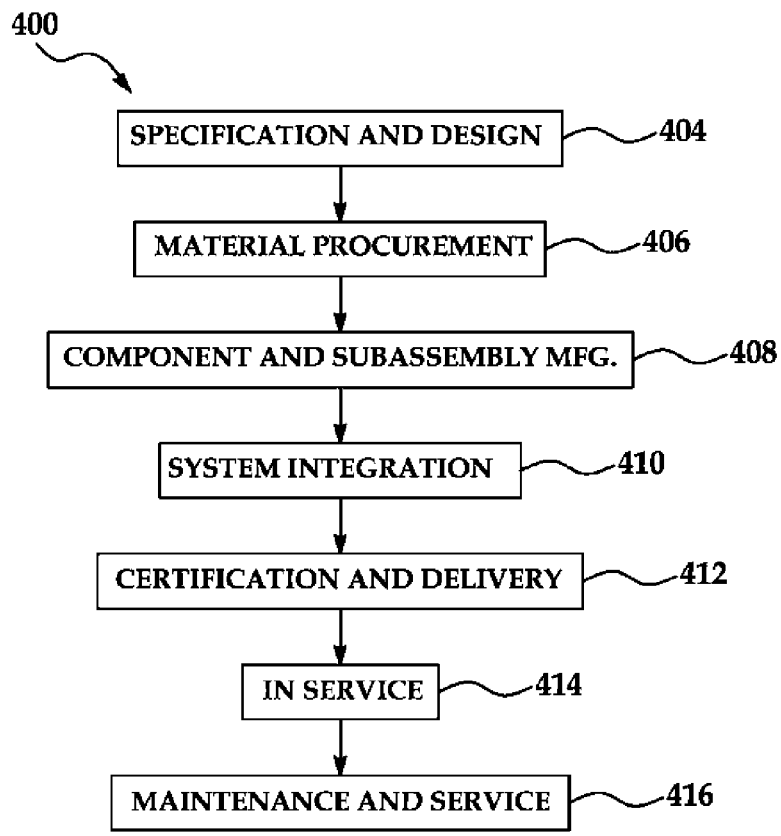
FIG. 40 is a flow diagram of aircraft production and service methodology.
Figure 41:
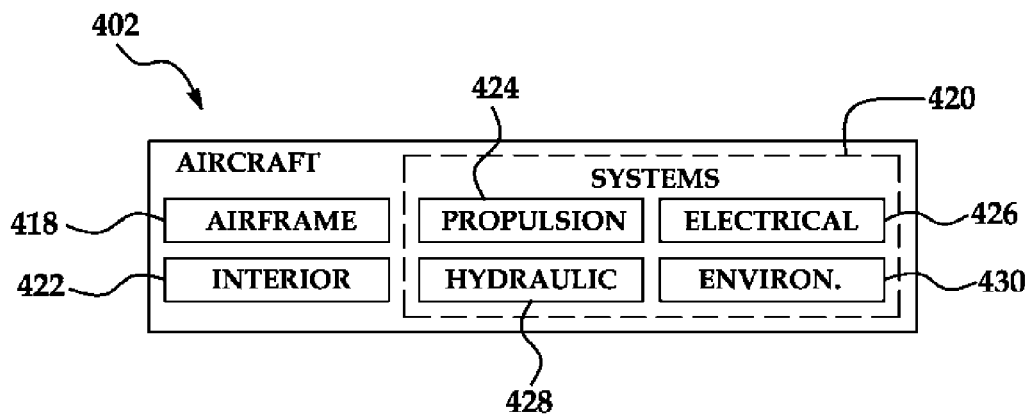
FIG. 41 is a block diagram of an aircraft.

Embodiments of the disclosure may find use in a variety of potential applications, particularly in the transportation industry, including for example, aerospace, marine and automotive applications. Thus, referring now to FIGS. 40 and 41, embodiments of the disclosure may be used in the context of an aircraft manufacturing and service method 400 as shown in FIG. 40 and an aircraft 402 as shown in FIG. 41. During pre-production, exemplary method 400 may include specification and design 404 of the aircraft 402 and material procurement 406. During production, component and subassembly manufacturing 408 and system integration 410 of the aircraft 402 takes place. Thereafter, the aircraft 402 may go through certification and delivery 412 in order to be placed in service 414. While in service by a customer, the aircraft 212 may be scheduled for routine maintenance and service 416 (which may also include modification, reconfiguration, refurbishment, and so on).

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 41, the aircraft 402 produced by exemplary method 400 may include an airframe 418 with a plurality of systems 420 and an interior 422. Examples of high-level systems 420 include one or more of a propulsion system 424, an electrical system 426, a hydraulic system 428, and an environmental system 430. Any number of other systems may be included. Although an aerospace example is shown, the principles of the disclosure may be applied to other industries, such as the marine and automotive industries.

Systems and methods embodied herein may be employed during any one or more of the stages of the production and service method 400. For example, components or subassemblies corresponding to production process 408 may be fabricated or manufactured in a manner similar to components or subassemblies produced while the aircraft 402 is in service. Also, one or more apparatus embodiments, method embodiments, or a combination thereof may be utilized during the production stages 408 and 410, for example, by substantially expediting assembly of or reducing the cost of an aircraft 402. Similarly, one or more of apparatus embodiments, method embodiments, or a combination thereof may be utilized while the aircraft 402 is in service, for example and without limitation, to maintenance and service 416.

Figure 42:
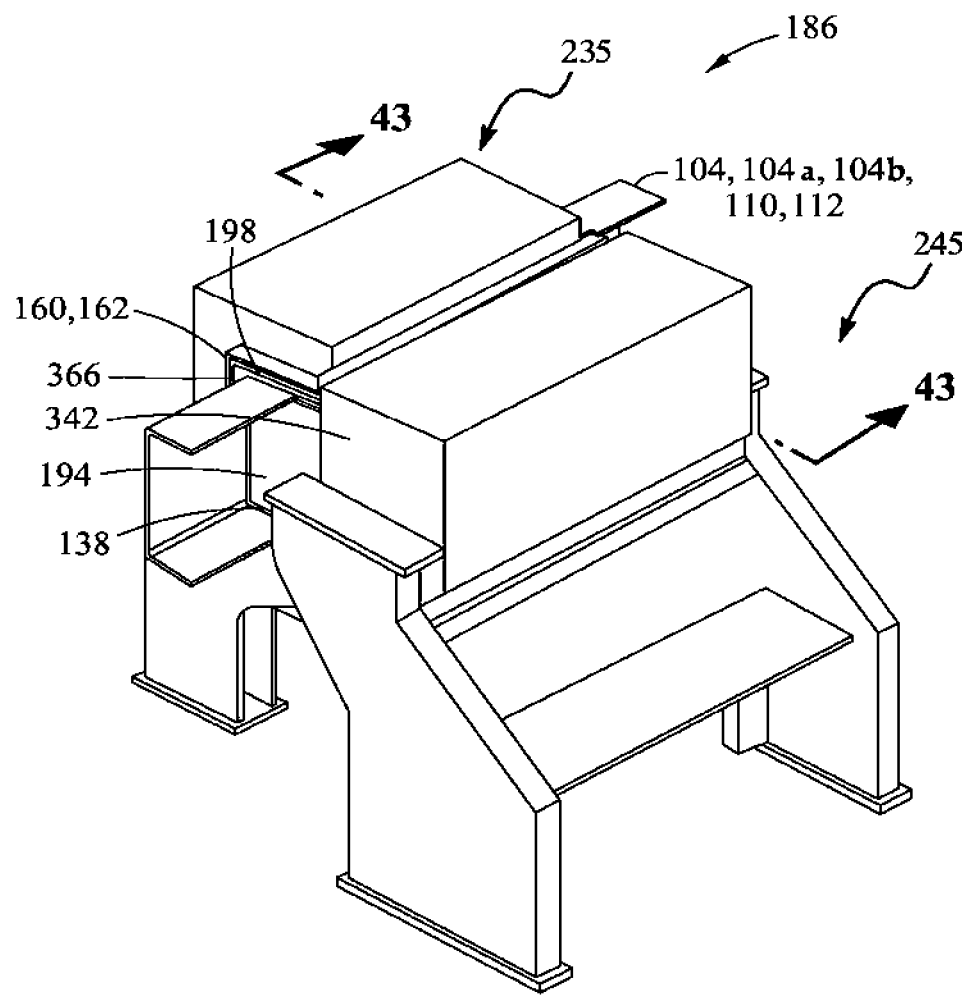
FIG. 42 is a perspective illustration of the bonding machine in the closed position.

Referring to FIGS. 42-46, shown is an embodiment of the bonding machine 186 having one or more thermally conductive tool liners 138 installed to the bonding machine 186 to facilitate heating of the mandrel 194 to a uniform temperature. By heating the mandrel 194 to a uniform temperature, the splice joint 110 comprising the composite sections 104a, 104b and splice member 112 may likewise be cured at a uniform temperature across an area of the splice joint 110. As can be seen in FIG. 42, the bonding machine 186 is shown with the pressure tower 245 and tool tower 235 in the closed position and the composite sections 104a, 104b extending outwardly from the bonding machine 186.

Referring to FIGS. 43-44, shown is the mandrel 194 of a heated tool assembly 150. The mandrel 194 may include a tool liner 138 mounted to the inner surfaces of the mandrel 194. As shown in FIG. 44, the mandrel 194 may be generally hollow and may comprise the top wall joining the side walls and being bounded by the pair of end walls (FIG. 44). As was indicated above, the mandrel 194 may be formed of any suitable material such as Invar due to the favorably low coefficient of thermal expansion of Invar. As shown in FIG. 44, the mandrel 194 may include one or more of the tool liners 138 which may be mounted on the inner surfaces 130a, 132a, 134a of the mandrel 194 such that the heated medium 152 (FIG. 23) (e.g., air) that is directed onto the tool liners 138 may be uniformly distributed throughout the tool liner 138 for uniform heating of the mandrel 194. The tool liner 138 may be applied to the portions of the mandrel 194 that are in thermal contact with the composite sections 104a, 104b (FIG. 42) and splice member 112 (FIG. 42). For example, as shown in FIG. 43, the tool liner 138 may be applied to one or more of the inner surfaces 130a, 132a, of the top wall 130 and side walls 132 of the mandrel 194 in the areas where the outer surfaces 130b, 132b are in direct contact with the composite sections 104a, 104b (FIG. 42) and splice member 112 (FIG. 42). The tool liner 138 may optionally be installed along the end walls 134 or at any other location on the mandrel 194.

The tool liner 138 is preferably formed of a material having a relatively high thermal conductivity to facilitate the attainment of substantially uniform temperature along a linear profile of the outer surfaces 130b, 132b of the mandrel 194 in contact with the composite sections and splice member. The tool liner 138 may be formed of a copper and/or aluminum sheet or any other material, without limitation, having a relatively high thermal conductivity. In an embodiment, the thermal conductivity is within the range of from approximately 200 W/mK to approximately 600 W/mK measured at 85.degree. C.

The tool liner may be provided in any suitable thickness or range of thicknesses up to approximately 1.0 inch and above. For example, the tool liner may be provided in a thickness of 0.25 inch for mounting to a top wall or side wall of a mandrel of approximately 1.0 inch. The preferred thickness may be dictated in part by the geometry or thickness of the mandrel. In an embodiment, the combined thermal mass of the mandrel may preferably be minimized in order to increase the uniformity of the temperature profile across the mandrel. The tool liner may be mounted to the inner surfaces of the mandrel in any manner preferably providing a relatively high degree of thermal contact therebetween.

Figure 46:
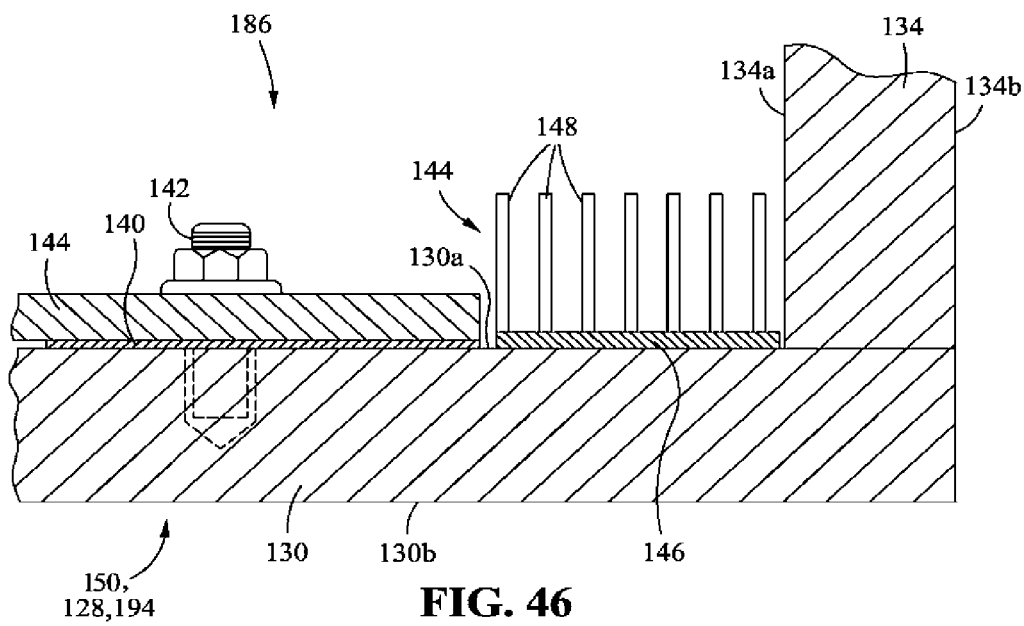
FIG. 46 is a partial sectional illustration of the mandrel illustrating the mounting of the tool liner and heat sinks.

For example and referring to FIGS. 44-46, the tool liner 138 may be mechanically fastened to the mandrel 194 such as by using mechanical fasteners 142. As best seen in FIG. 46, the mechanical fasteners 142 may comprise threaded studs directly mounted in the mandrel 194 and securing the tool liner 138 thereto. The mechanical fasteners 142 may be arranged in any suitable spacing or pattern such as the pattern illustrated in FIGS. 43-45. However, the mechanical fasteners 142 for mounting the tool liner 138 may comprise any one of a variety of different fastening configurations arranged in any suitable pattern. Furthermore, the tool liner 138 may be mounted to the mandrel 194 by alternative means including, but not limited to, press fitting, adhesive bonding, welding, brazing, flame spraying, and/or by any other suitable mechanism or combination of mechanisms.

Referring to FIGS. 45-46, the tool liner 138 may preferably, but optionally, be provided as a single, continuous length extending across the inner surfaces 130a, 132a to facilitate uninterrupted spreading of heat across the mandrel 194. In order to improve the thermal contact between the tool liner 138 and the inner surfaces 130a, 132a, 134a of the mandrel 194, a thermally conductive film 140 (FIG. 46) such as a thermal paste may be installed between the tool liner 138 and the inner surfaces 130a, 132a, of the top wall 130 and side walls 132. The thermal paste may facilitate heat transfer between the inner surfaces 130a, 132a of the top wall 130 and side walls 132 and the tool liner 138 and provide adhesive capabilities for bonding the tool liner 138 to the inner surfaces 130a, 132a of the top wall 130 and side walls 132 or to any other location where the tool liner 138 is mounted to the mandrel 194.

Referring to FIGS. 44-45, the mandrel 194 may include one or more stiffeners 136 extending along one or more of the inner surfaces 130a, 132a of the mandrel 194. For example, the stiffeners 136 may be located between the side walls 132 and/or end walls 134 of the mandrel 194. Such stiffeners 136 may act as partial partition walls forming compartments or zones 339 in the mandrel 194. For example, FIG. 45 illustrates tool liners 138 installed in each of four (4) zones 339 formed by a pair of stiffeners 136 extending both lengthwise and widthwise along the inner surface 130a of the top wall 130 of the mandrel 194. Tool liners 138 may be installed within one or more of the zones 339 such as by mechanical fastening of the tool liners 138 to the mandrel 194 as illustrated in FIG. 46. Thermally conductive film 140 may be installed between the surfaces 130a, 132a and the tool liner 138 to improve heat transfer into the mandrel 194.

The heating system 284 (FIG. 22) for the tool tower 235 (FIG. 22) may facilitate the delivery of heated medium 152 (FIG. 32) onto the tool liner 138 as described above. The heated medium 152 (FIG. 32) may comprise heated gas such as air and may be generated by a heater as illustrated in FIGS. 20-21. As shown in FIG. 23, the blower 294 may be included in the heating system 284 for blowing the heated medium 152 though one or more nozzles (FIG. 21) into the mandrel 194 and onto the tool liner 138. As indicated above, the nozzles (FIG. 21) may extend into the zones 339 to direct the heated medium onto the tool liner 138 in each zone.

Referring briefly to FIG. 44, although the tool liners are shown as being mounted to the end walls 134, the tool liners 138 may be omitted from the end walls 134 to avoid excessive heating thereof which may result in overheating of the outer surfaces of the localized areas of the composite components 104a, 104b (FIG. 42). Further in this regard, one or more heat sinks 144 may be mounted to the mandrel 194 adjacent to the end walls 134 to draw heat into the top wall 130 and side walls 132. The heat sinks 144 may be located adjacent to the end walls 134 or in any other area where reduced or increased heat input is desired. The heat sinks 144 may include features such as pin fins 148 to provide increased surface area for transferring heat to the mandrel 094. Alternatively, heat sinks 144 may also be installed at locations were cooling of the mandrel 194 is desired. For example, heat sinks 144 may be installed at areas of the mandrel 194 that may be subject to overheating due to increased thermal mass of the mandrel 194 at certain portions of the mandrel 194. As shown in FIG. 46, heat sinks 144 may prevent excessive heating at the intersection of the top wall 130 with the end walls 134 of the mandrel 194. Such excessive heat may compromise the attainment of a substantially uniform temperature profile across the mandrel 194.

As indicated above, the heat sinks 144 may be installed at any location of the mandrel 194. For example, the heat sinks 144 may be arranged to extend along a width of the top wall 130 and along a length of the side walls 132 as best seen in FIG. 44. The heat sinks 144 may be provided in any size (i.e., width and height) and shape and may be configured in consideration of the geometry (e.g., thickness) of the mandrel 194 and other factors such as the curing temperature of the composite sections 104a, 104b (FIG. 42). In an embodiment shown in FIG. 46, the heat sinks 144 may comprise a heat sink base 146 mounted to the inner surfaces 130a, 132a such as by mechanical attachment and/or by bonding or by any other suitable means. A thermally conductive film 140 may be included between the heat sink base 146 and the inner surface of the top wall 130 and/or side walls 132 to improve heat transfer. The heat sink 144 may, in an embodiment, include pins fins 148 extending outwardly from the heat sink base 146 for transfer of heat to the local environment.

FIG. 43 further illustrates a bladder liner 160 that may optionally be mounted on a side of the pressure bladder 198 opposite the mandrel 194. As indicated above, thermal insulation 366 (FIG. 32) may be mounted on the pressure bladder 198 in order to retain heat within the mandrel 194. The bladder liner 160 may be mechanically fastened to a bladder frame 199 (FIG. 17) and/or adhesively bonded thereto. The bladder liner 160 may optionally be installed between the thermal insulation 366 and the pressure bladder 198 and may include a heater element 162 mounted to the bladder liner 160 for distributing heat to the pressure bladder 198.

Figure 47:
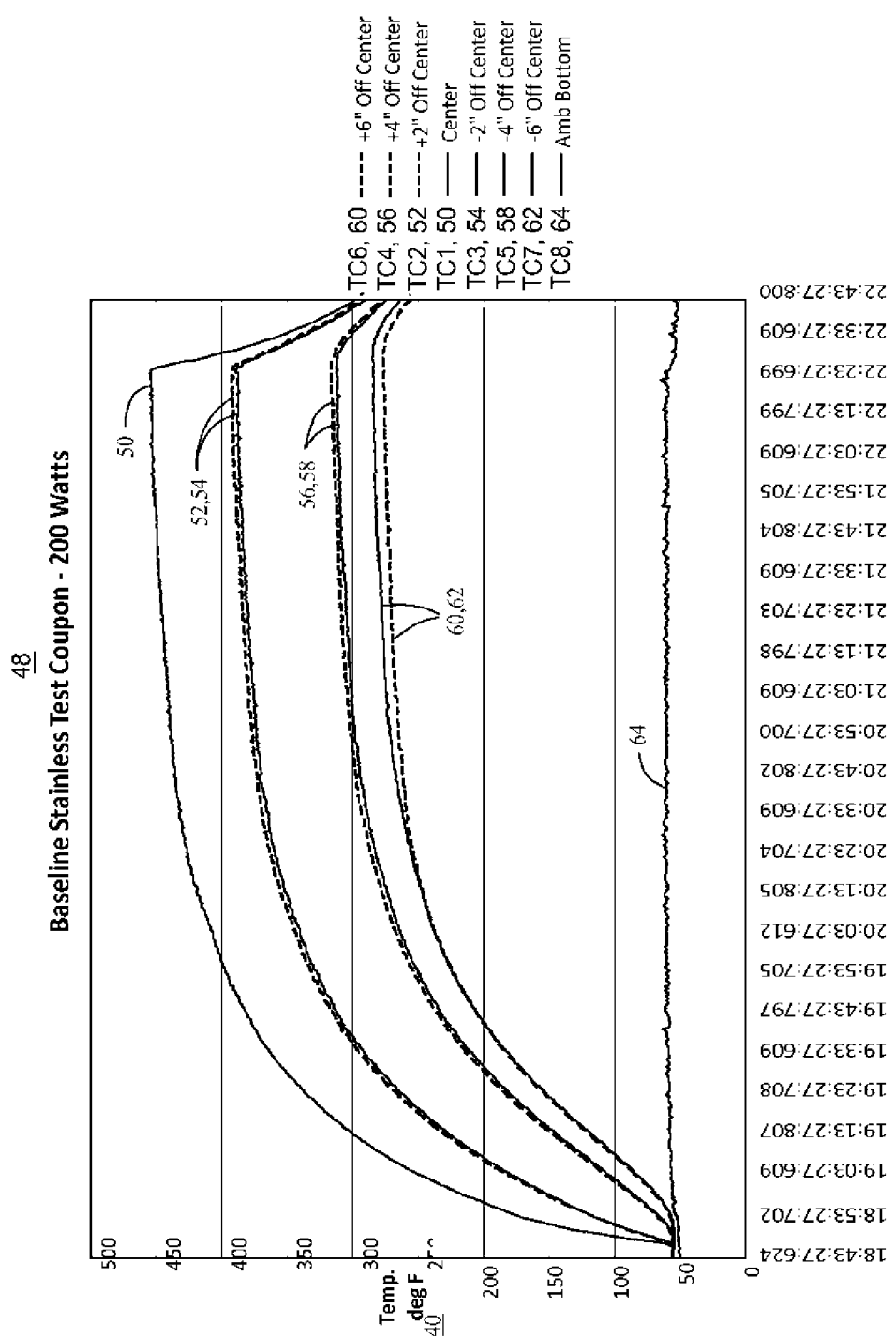
FIG. 47 is a plot of temperature over time for a test coupon formed of stainless steel without a thermal spreader mounted thereto.
Figure 48:
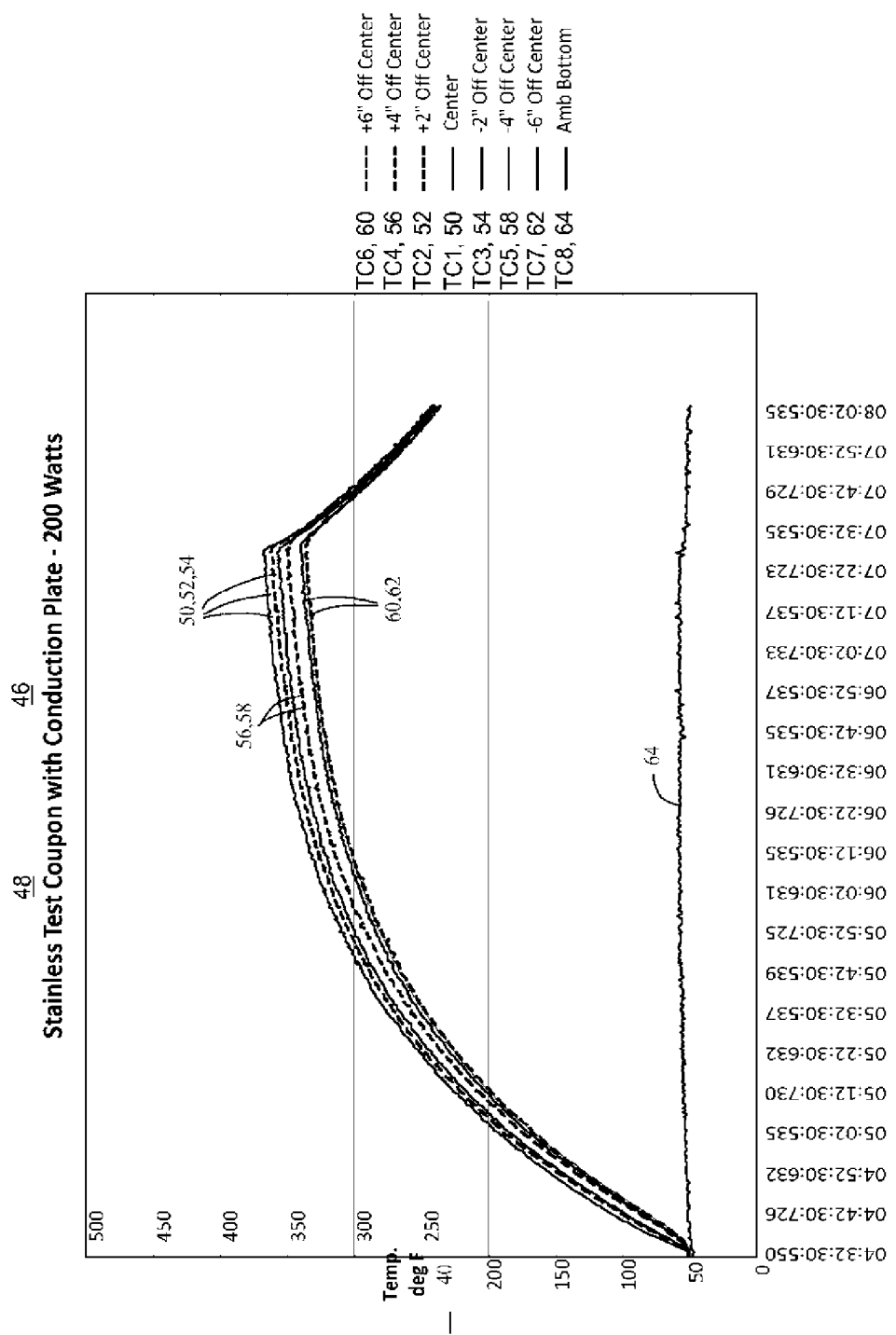
FIG. 48 is a plot of temperature over time for the test coupon of FIG. 47 and having a thermal spreader mounted thereto and illustrating the substantially uniform temperatures of different locations of the test coupon.

Referring to FIGS. 47-48, shown are illustrations of plots of temperature 40 versus time 42 for a test coupon 48 formed of stainless steel that was tested to assess the effect on temperature profile as a result of applying a thermal spreader to the test coupon 48. Thermocouples TC1 through TC7, 50, 52, 54, 56, 58, 60, 62 were mounted to the test coupon 48 at different locations. One thermocouple TC8, 64 was mounted at a location off the test coupon 48 as a reference. Heat was applied to a mid-point location of the test coupon 48 for the test results illustrated in FIG. 47. In FIG. 48, a conduction plate 46 or thermal spreader fabricated from 0.25 inch thick copper was fastened to the test coupon 48. Heat was applied at a midpoint of the conduction plate 46 for the test results illustrated in FIG. 48. In this regard, heating of 200 watts per unit surface area was applied over a four (4) hour time period at a constant rate for each of the test cases illustrated in FIGS. 47 and 48 to achieve a steady state temperature.

As can be seen in FIG. 47, none of the thermocouples TC2 through TC7, 52, 54, 56, 58, 60, 62 attained a steady state temperature that was less than 50.degree. F. difference from the steady state temperature of 450.degree. F. measured by thermocouple TC1, 50 at the center of the test coupon 48. Thermocouples TC6 and TC7, 60, 62 were located the furthest distance from the center thermocouple TC1, 50 and measured steady state temperatures that were greater than 150.degree. F. relative to the temperature measured by the center thermocouple TC1, 50. However, referring to FIG. 48, it can be seen that the addition of the copper conduction plate 46 resulted in all of the thermocouples TC1 through TC7, 50, 52, 54, 56, 58, 60, 62 measuring temperatures that were within approximately 30.degree. F. of the temperature measured by the center thermocouple TC1, 50. As illustrated in the plot of FIG. 48, the addition of the conduction plate 46 results in a significant improvement in temperature uniformity. In a similar manner, the addition of the tool liners 138 (FIG. 42) to the mandrel 194 as illustrated in FIGS. 42-46 results in a substantially uniform temperature distribution of the mandrel 194 (FIG. 42).

Figure 49:
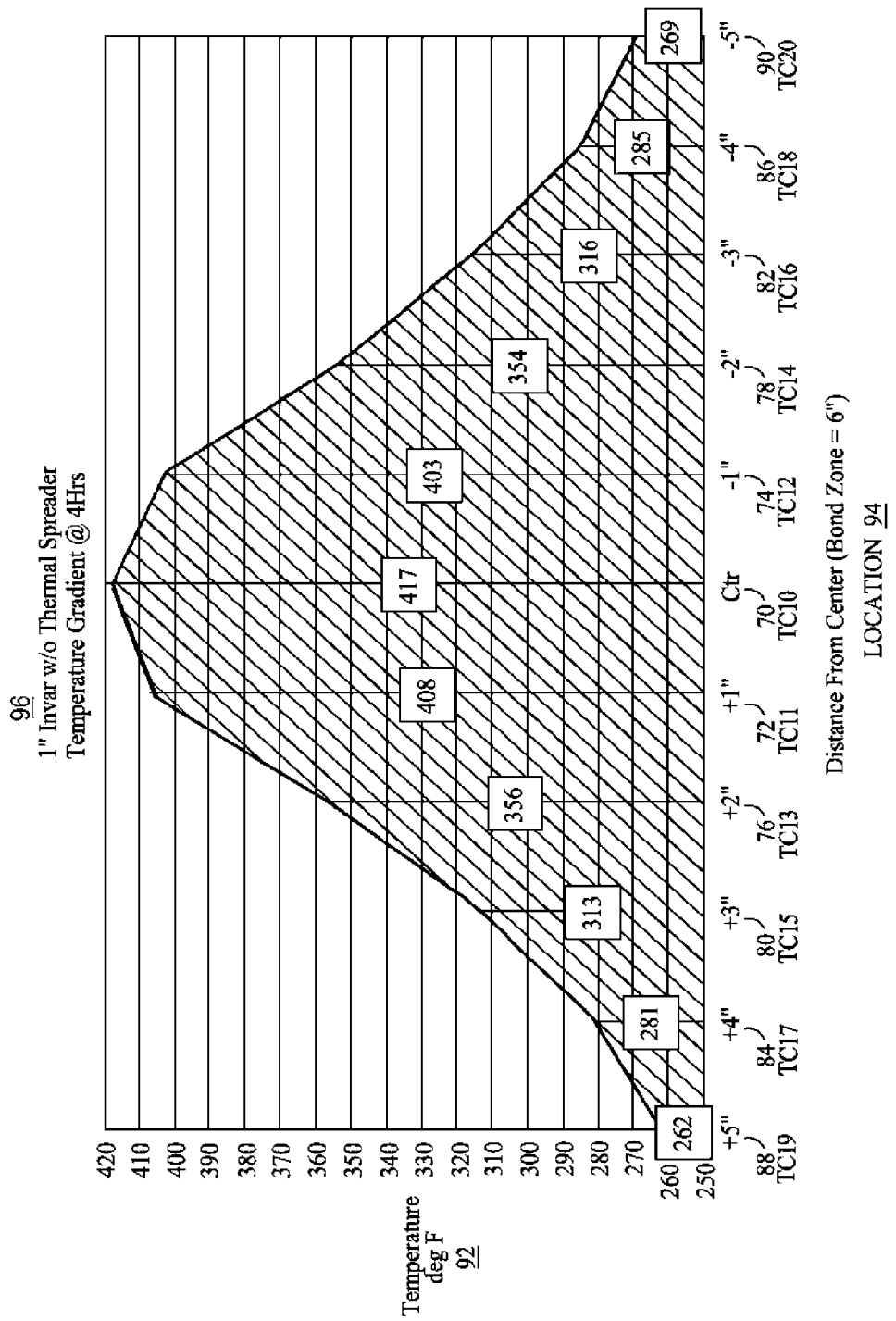
FIG. 49 is a plot of temperature gradient across a test coupon formed of invar and without a thermally conductive layer (i.e., thermal spreader) mounted thereto.
Figure 50:
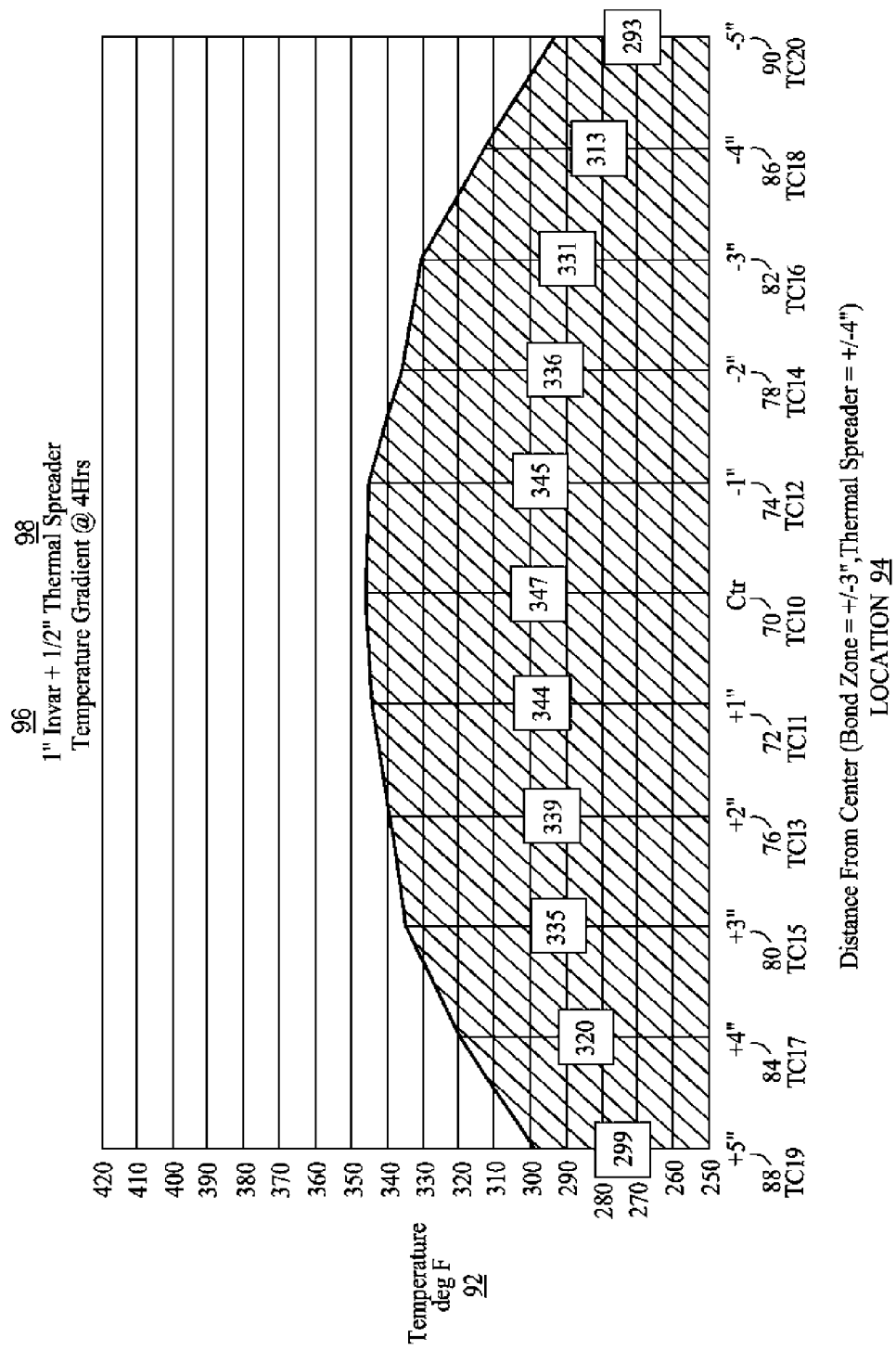
FIG. 50 is a plot of temperature gradient across the test coupon of FIG. 49 and having the thermal spreader mounted thereto and illustrating the increase in temperature uniformity.

Referring to FIGS. 49-50, shown are illustrations of plots of temperature 90 gradient measured at several locations 92 across an Invartest coupon 96 formed of Invar. FIG. 49 illustrates the temperature profile for the test coupon 96 without the addition of a thermal spreader 98 (i.e., conduction plate) to the Invar test coupon 96. FIG. 50 illustrates the temperature profile for the test coupon 96 with the thermal spreader 98 added thereto. In each of the plots illustrated in FIGS. 49 and 50, the Invar test coupon 96 was formed in a length of 12 inches, a width of four (4) inches, and a thickness of one (1) inch. The thermal spreader 98 was fabricated from copper plate having a length of eight (8) inches, a width of four (4) inches and a thickness of 0.5 inch.

The Invar test coupon 96 was mounted to the thermal spreader 98 with thermally conductive adhesive or film for the full eight (8) inch length of the thermal spreader 98. Thermocouples TC10 through TC20, 70, 72, 74, 76, 78, 80, 82, 84, 86, 88, 90, were mounted to the Invar test coupon 96 on a side thereof opposite the thermal spreader 98 at 1 inch spacings along the length thereof. A constant supply of 200 watts of heating power per unit surface area was applied to the Invar test coupon 96 over a four (4) hour time period to attain a steady state temperature of approximately 350.degree. F.

As can be seen in FIG. 49 for the test coupon 96 without the thermal spreader 98, the temperature profile varies by almost 155.degree. F. across the length of the test coupon 96 and by almost 104.degree. F. across the 6 inch centered length of the Invar test coupon 96. For example, the center thermocouple TC10 70 measured a temperature of approximately 417.degree. F. as compared to a temperature of approximately 262.degree. F. measured at the thermocouple TC20 88 located the furthest from the center thermocouple TC10 70. In contrast, FIG. 50 illustrates the temperature profile of the Invar test coupon 96 having the thermal spreader 98 mounted thereto. As can be seen, the FIG. 50 illustrates a temperature variation of less than approximately 54.degree. F. measured across the full 12-inch length of the test coupon 96 and less than approximately 16.degree. F. measured across the 6-inch centered length of the Invar test coupon 96. As is illustrated by comparing the temperature profiles of FIGS. 49 and 50, the addition of the thermal spreader 98 results in a significant improvement in temperature uniformity.

Figure 51:
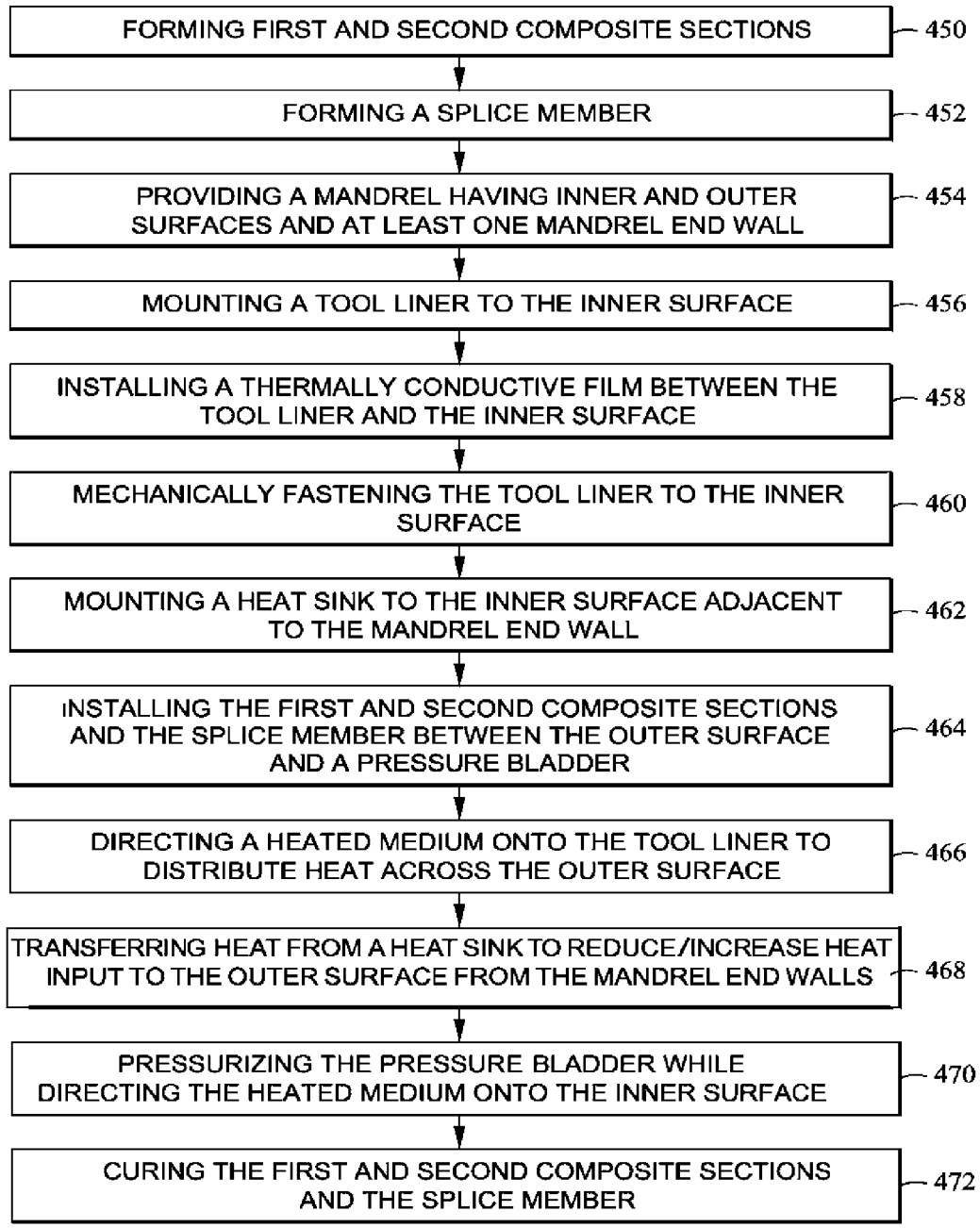
FIG. 51 is a flow diagram of a method of forming a composite structural member using a bonding machine.

Referring to FIG. 51, shown is an illustration of a methodology of forming a structural member 104 formed by joining the composite sections 104*a*, 104*b*, 104*c* illustrated in FIG. 1. In FIG. 51, step 450 comprises forming first and second composite sections 104*a*, 104*b* (FIG. 1) and the splice member 112 (FIG. 1) in step 452 as described above with regard to FIG. 1. Step 454 comprises providing a mandrel 194 (FIG. 45) having inner and outer surfaces 130*a*, 132*a*, 130*b*, 132*b* (FIGS. 45-46) of the top and bottom walls 130, 132 and at least one end wall 134 as shown in FIGS. 45-46. Step 456 comprises mounting a tool liner 138 (FIG. 45) to the one or more of the inner surfaces 130*a*, 132*a*, (FIG. 45) of the top wall 130 and side walls 132 (FIG. 45) of the mandrel 194 as shown in FIG. 45. As shown in FIG. 43, the outer surfaces 130*b*, 132*b* may be in direct contact with the composite sections 104*a*, 104*b* (FIG. 1) and the splice member 112 (FIG. 1).

Referring still to FIG. 51, step 458 comprises installing the thermally conductive film 140 (FIG. 46) between the tool liner 138 (FIG. 46) and the inner surface 130*a* (FIG. 46) in order to improve the thermal contact therebetween. As illustrated in the plot of FIG. 50, the addition of the tool liner 138 (FIG. 46) improves the temperature uniformity of the mandrel 194 (FIG. 46). Step 460 may comprise mechanically fastening the tool liner 138 (FIG. 46) to the inner surfaces 130*a*, 132*a* (FIGS. 45-46) to improve the thermal contact therebetween. Step 462 comprises mounting one or more heat sinks 144 (FIG. 46) to the inner surfaces 130*a*, 132*a* (FIGS. 45-46) adjacent to the mandrel 194 end walls 134 (FIG. 46) to draw excess heat out of the top wall and side walls 130, 132 (FIGS. 45-46) at the extreme edges thereof to prevent excessive heat at that location. Alternatively, the heat sinks 144 (FIGS. 45-46) may facilitate increasing heat input into areas of the mandrel.

In FIG. 51, step 464 may comprise installing the first and second composite sections 104*a*, 104*b* (FIG. 1) and the splice member 112 (FIG. 1) between the outer surfaces 130*b*, 132*b* (FIG. 43) and a pressure bladder 198 as illustrated in FIG. 43. Step 466 may comprise directing a heated medium 152 (FIG. 23) onto the tool liner 138 (FIG. 43) to distribute heat across the outer surfaces 130*b*, 132*b* (FIG. 43) in a manner as indicated above with. Step 468 may comprise transferring heat from the heat sinks 144 (FIGS. 45-46) to reduce heat input to the outer surfaces 130*b*, 132*b* (FIG. 43) from the mandrel 194 end walls 134 (FIG. 46). In this manner, the heat sinks 144 may prevent or reduce localized temperature increases in the outer surfaces 130*b*, 132*b* (FIG. 43) of the top and side walls 130, 132 (FIGS. 45-46) due to the large thermal mass of the end walls 134 (FIG. 46). Step 470 may comprise pressurizing the pressurized bladder 198 (FIG. 43) while directing the heat onto the inner surfaces 130*a*, 132*a* (FIG. 45) for curing the first and second composite sections 104*a*, 104*b* (FIG. 1) and the splice member 112 (FIG. 1) in step 472.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method for producing a composite structural member, comprising:
    positioning a first composite section and a second composite section on a tool, the tool being supported by a tool platform and wherein the tool comprises an inner surface and a top wall joining a side wall at a wall intersection, the tool platform and a pressure platform relatively movable between an open position and a closed position; the tool having a non-planar outer surface against which the composite structural member may be pressed;
    positioning a composite splice member at least partially overlapping both the first composite section and the second composite section to form a splice joint that joins the first composite section and the second composite section in an end-to-end relationship in the composite structural member;
    pressing the composite structural member against the non-planar outer surface of the tool by applying pressure to the splice joint from a pressure bladder;
    applying heat to the composite structural member at the splice joint to cure the composite splice member to the first composite section and the second composite section, wherein the heat is applied through a tool liner applied to the inner surface of the tool, wherein the tool liner is in thermal contact with the inner surface of the tool for distributing the heat, and wherein a heat sink is in thermal contact with a portion of the inner surface and being mounted between the tool liner and the wall intersection.

2. The method of claim 1, wherein the tool further comprises a heating system for heating the composite structural member, the method further comprising:
    applying heat to the composite structural member, wherein the heating system facilitates delivery of a heated medium to the tool liner though one or more nozzles.

3. The method of claim 2, wherein the heated medium comprises a heated gas.

4. The method of claim 1, wherein the tool liner is formed of material having a higher thermal conductivity than the thermal conductivity of the tool.

5. The method of claim 1, wherein the tool liner comprises at least one of a copper and aluminum sheet.

6. The method of claim 1, wherein the tool liner has a thermal conductivity in the range of from approximately 200 W/mK to approximately 600 W/mK measured at 85.degree. C.

7. The method of claim 1 further comprising:
interposing a thermally conductive film between the tool liner and the inner surface.

8. The method of claim 7 wherein the thermally conductive film comprises a thermal paste.

9. The method of claim 1, further comprising:
forming the first composite section by forming a first layup of plies of fiber reinforced polymer resin and curing the first layup;
forming the second composite section by forming a second layup of the plies of fiber reinforced polymer resin and curing the second layup;
forming the composite splice member by forming a third layup of the plies of fiber reinforced polymer resin; and
bonding the composite splice member by placing the third layup on the first composite section and the second composite section and then curing the third layup.

10. The method of claim 9, wherein:
forming the first layup includes forming a first ramp along an edge of the first layup,
forming the second layup includes forming a second ramp along a second edge of the second layup, and
forming the third layup includes forming third and fourth ramps, respectively, overlapping the first ramp and the second ramp when the third layup has been placed on the first composite section and the second composite section.

11. The method of claim 9, wherein bonding the composite splice member includes:
placing a vacuum bag over the splice joint, and
using the vacuum bag to apply pressure to the splice joint.

12. The method of claim 1, wherein each of the first composite section and the second composite section has a cross section selected from a group consisting of:
a C shape,
a Z shape,
a J shape,
a T shape,
an I shape, and
a hat shape.

13. The method of claim 1, wherein the composite structural member is one selected from a group consisting of:
a spar,
a beam,
a stringer, and
a frame.

* * * * *